US00RE48075E

(19) United States
(12) Reissued Patent
Sibert

(10) Patent Number: US RE48,075 E
(45) Date of Reissued Patent: Jun. 30, 2020

(54) ILLUMINATION CONTROL NETWORK

(71) Applicant: IDEAL Industries Lighting LLC, Sycamore, IL (US)

(72) Inventor: W. Olin Sibert, Billerica, MA (US)

(73) Assignee: IDEAL Industries Lighting LLC, Sycamore, IL (US)

(21) Appl. No.: 15/494,989

(22) Filed: Apr. 24, 2017

Related U.S. Patent Documents

Reissue of:
(64) Patent No.: 8,035,320
Issued: Oct. 11, 2011
Appl. No.: 12/148,531
Filed: Apr. 18, 2008

U.S. Applications:
(62) Division of application No. 14/051,709, filed on Oct. 11, 2013, now Pat. No. Re. 46,430, which is an application for the reissue of Pat. No. 8,035,320.

(60) Provisional application No. 60/912,997, filed on Apr. 20, 2007, provisional application No. 60/913,796, filed on Apr. 24, 2007.

(51) Int. Cl.
*H05B 37/00* (2006.01)
*H05B 47/175* (2020.01)
*H05B 47/12* (2020.01)
*H05B 47/155* (2020.01)

(52) U.S. Cl.
CPC ..... *H05B 47/175* (2020.01); *H05B 47/12* (2020.01); *H05B 47/155* (2020.01); *Y02B 20/48* (2013.01)

(58) Field of Classification Search
CPC ..... H05B 33/0827; H05B 33/0815
See application file for complete search history.

(56) References Cited

U.S. PATENT DOCUMENTS

| | | | | |
|---|---|---|---|---|
| 4,095,139 | A * | 6/1978 | Symonds et al. | 315/153 |
| 4,461,977 | A | 7/1984 | Pierpoint et al. | |
| D344,361 | S | 2/1994 | Friedman et al. | |
| D349,582 | S | 8/1994 | Bain et al. | |
| 5,376,925 | A | 12/1994 | Crisafulli et al. | |
| D373,438 | S | 9/1996 | McCann-Compton et al. | |
| 5,607,217 | A | 3/1997 | Hobbs, II | |
| 5,668,446 | A | 9/1997 | Baker | |

(Continued)

FOREIGN PATENT DOCUMENTS

| | | | |
|---|---|---|---|
| CA | 2511368 | A1 | 5/2002 |
| JP | 2005010956 | A | 1/2005 |

(Continued)

OTHER PUBLICATIONS

Non-Final Office Action for U.S. Appl. No. 15/494,799, dated Jan. 29, 2018, 22 pages.

(Continued)

*Primary Examiner* — Angela M Lie
(74) *Attorney, Agent, or Firm* — Withrow & Terranova, P.L.L.C.

(57) ABSTRACT

The present invention addresses the problem of providing illumination in a manner that is energy efficient and intelligent. In particular, the present invention uses distributed processing across a network of illuminators to control the illumination for a given environment. The network controls the illumination level and pattern in response to light, sound, and motion. The network may also be trained according to uploaded software behavior modules, and subsets of the network may be organized into groups for illumination control and maintenance reporting.

11 Claims, 16 Drawing Sheets

(56) References Cited

U.S. PATENT DOCUMENTS 6,118,230 A 9/2000 Fleischmann
6,160,359 A 12/2000 Fleischmann
6,166,496 A 12/2000 Lys et al.
6,292,901 B1 * 9/2001 Lys et al. ..... 713/300
6,320,331 B1 * 11/2001 Iida et al. ..... 315/293
6,331,756 B1 12/2001 Belliveau
6,437,692 B1 8/2002 Petite et al.
6,459,919 B1 10/2002 Lys et al.
6,486,778 B2 11/2002 Mahler et al.
6,522,969 B2 2/2003 Kannonji
6,548,967 B1 4/2003 Dowling et al.
6,553,218 B1 4/2003 Boesjes
6,608,453 B2 8/2003 Morgan et al.
6,621,239 B1 * 9/2003 Belliveau ..... 315/312
6,735,630 B1 5/2004 Gelvin et al.
6,777,891 B2 8/2004 Lys et al.
6,804,790 B2 10/2004 Rhee et al.
6,826,607 B1 11/2004 Gelvin et al.
6,832,251 B1 12/2004 Gelvin et al.
6,859,831 B1 2/2005 Gelvin et al.
6,914,893 B2 7/2005 Petite
6,967,447 B2 11/2005 Lim et al.
6,969,954 B2 11/2005 Lys
6,975,851 B2 12/2005 Boesjes
7,020,701 B1 3/2006 Gelvin et al.
7,031,920 B2 4/2006 Dowling et al.
7,103,511 B2 9/2006 Petite
7,139,617 B1 11/2006 Morgan et al.
7,161,556 B2 1/2007 Morgan et al.
7,187,279 B2 3/2007 Chung
7,202,613 B2 4/2007 Morgan et al.
7,204,622 B2 4/2007 Dowling et al.
7,228,190 B2 6/2007 Dowling et al.
7,233,831 B2 6/2007 Blackwell
7,242,421 B2 7/2007 Center, Jr. et al.
7,305,467 B2 12/2007 Kaiser et al.
7,309,965 B2 12/2007 Dowling et al.
7,313,399 B2 12/2007 Rhee et al.
D560,006 S 1/2008 Garner et al.
7,344,279 B2 * 3/2008 Mueller et al. ..... 362/294
D565,771 S 4/2008 Garner et al.
D567,431 S 4/2008 Garner et al.
7,353,071 B2 4/2008 Blackwell et al.
7,385,359 B2 6/2008 Dowling et al.
7,391,297 B2 6/2008 Cash et al.
D582,598 S 12/2008 Kramer et al.
7,460,690 B2 12/2008 Cohen et al.
7,468,661 B2 12/2008 Petite et al.
7,484,008 B1 1/2009 Gelvin et al.
D586,950 S 2/2009 Garner et al.
D587,390 S 2/2009 Garner et al.
D588,064 S 3/2009 Garner et al.
7,522,540 B1 * 4/2009 Maufer ..... H04L 45/18 370/254
7,522,563 B2 4/2009 Rhee
7,565,006 B2 7/2009 Stam et al.
7,606,572 B2 10/2009 Rhee et al.
7,657,249 B2 2/2010 Boesjes
7,697,492 B2 4/2010 Petite
7,731,383 B2 * 6/2010 Myer ..... F21S 8/083 362/145
7,733,224 B2 * 6/2010 Tran ..... G06F 19/3418 340/540
7,762,821 B2 7/2010 Patterson et al.
7,797,367 B1 9/2010 Gelvin et al.
7,844,308 B2 11/2010 Rhee et al.
7,844,687 B1 11/2010 Gelvin et al.
7,865,512 B2 1/2011 Evans
7,891,004 B1 2/2011 Gelvin et al.
7,904,569 B1 3/2011 Gelvin et al.
7,924,174 B1 4/2011 Gananathan
7,924,927 B1 4/2011 Boesjes
7,936,281 B2 5/2011 Cash et al.
7,948,930 B2 5/2011 Rhee
8,021,021 B2 9/2011 Paolini
8,035,320 B2 10/2011 Sibert
8,079,118 B2 12/2011 Gelvin et al.
8,098,615 B2 1/2012 Rhee
8,126,429 B2 2/2012 Boesjes
8,140,658 B1 3/2012 Gelvin et al.
8,203,445 B2 * 6/2012 Recker ..... G08B 5/36 340/531
8,214,061 B2 7/2012 Westrick, Jr. et al.
8,232,745 B2 * 7/2012 Chemel ..... H05B 37/0218 315/308
8,271,058 B2 9/2012 Rhee et al.
8,274,928 B2 9/2012 Dykema et al.
8,362,713 B2 * 1/2013 Recker ..... H05B 33/0803 307/44
8,579,452 B2 11/2013 Diederiks et al.
8,588,830 B2 * 11/2013 Myer ..... F21S 9/043 455/507
8,866,408 B2 * 10/2014 Chemel ..... H05B 37/029 315/291
9,066,393 B2 * 6/2015 Recker ..... H05B 33/0815
9,072,133 B2 * 6/2015 Chemel ..... F21S 2/005
9,215,781 B2 * 12/2015 Marman ..... G08B 13/19613
RE46,430 E 6/2017 Sibert
2004/0002792 A1 1/2004 Hoffknecht
2004/0160199 A1 8/2004 Morgan et al.
2005/0099824 A1 * 5/2005 Dowling ..... A61B 1/0653 362/572
2005/0132080 A1 6/2005 Rhee et al.
2005/0231134 A1 * 10/2005 Sid ..... H05B 37/0272 315/294
2007/0032990 A1 2/2007 Williams et al.
2007/0085702 A1 4/2007 Walters et al.
2007/0273290 A1 11/2007 Ashdown et al.
2008/0031213 A1 2/2008 Kaiser et al.
2009/0302994 A1 12/2009 Rhee et al.
2009/0302996 A1 12/2009 Rhee et al.
2009/0305644 A1 12/2009 Rhee et al.
2009/0315668 A1 12/2009 Leete, III et al.
2010/0128634 A1 5/2010 Rhee et al.
2010/0148940 A1 6/2010 Gelvin et al.
2010/0201516 A1 8/2010 Gelvin et al.
2011/0035491 A1 2/2011 Gelvin et al.
2011/0137757 A1 6/2011 Paolini et al.
2011/0215725 A1 9/2011 Paolini
2011/0298598 A1 12/2011 Rhee
2012/0013257 A1 1/2012 Sibert
2012/0079149 A1 3/2012 Gelvin et al.
2012/0087290 A1 4/2012 Rhee et al.
2012/0147808 A1 6/2012 Rhee
2012/0229048 A1 9/2012 Archer
2012/0235600 A1 9/2012 Simonian et al.
2013/0058258 A1 3/2013 Boesjes
2013/0075484 A1 3/2013 Rhee et al.

FOREIGN PATENT DOCUMENTS

WO 0126068 A1 4/2001
WO 0126328 A2 4/2001
WO 0126329 A2 4/2001
WO 0126331 A2 4/2001
WO 0126332 A2 4/2001
WO 0126333 A2 4/2001
WO 0126334 A2 4/2001
WO 0126335 A2 4/2001
WO 0126338 A2 4/2001
WO 1263270 A2 4/2001
WO 0239242 A1 5/2002
WO 2009151416 A1 12/2009
WO 2011090938 A1 7/2011
WO 2011152968 A1 12/2011
WO 2012112813 A2 8/2012
WO 2012125502 A2 9/2012

OTHER PUBLICATIONS

Non-Final Office Action for U.S. Appl. No. 12/148,531, dated Jan. 19, 2011, 6 pages.

(56) References Cited

OTHER PUBLICATIONS

Notice of Allowance for U.S. Appl. No. 12/148,531, dated Jun. 13, 2011, 5 pages.
Non-Final Office Action for U.S. Appl. No. 14/051,709, dated Mar. 18, 2014, 6 pages.
Non-Final Office Action for U.S. Appl. No. 14/051,709, dated Feb. 19, 2016, 17 pages.
Final Office Action for U.S. Appl. No. 14/051,709, dated Oct. 13, 2016, 22 pages.
Notice of Allowance for U.S. Appl. No. 14/051,709, dated Jan. 27, 2017, 10 pages.
Final Office Action for U.S. Appl. No. 15/494,799, dated Jun. 21, 2018, 23 pages.
Non-Final Office Action for U.S. Appl. No. 15/494,694, dated Sep. 26, 2018, 22 pages.
Non-Final Office Action for U.S. Appl. No. 15/494,799, dated Sep. 26, 2018, 24 pages.
Advisory Action for U.S. Appl. No. 15/494,694, dated Jul. 17, 2019, 4 pages.
Advisory Action for U.S. Appl. No. 15/494,799, dated Jun. 19, 2019, 4 pages.
Non-Final Office Action for U.S. Appl. No. 15/892,797, dated Aug. 19, 2019, 13 pages.
Applicant-Initiated Interview Summary for U.S. Appl. No. 15/494,694, dated Feb. 20, 2019, 5 pages.
Applicant-Initiated Interview Summary for U.S. Appl. No. 15/494,799, dated Feb. 20, 2019, 5 pages.
Final Office Action for U.S. Appl. No. 15/494,799, dated Apr. 11, 2019, 15 pages.
Non-Final Office Action for U.S. Appl. No. 15/892,797, dated Mar. 13, 2019, 12 pages.
Final Office Action for U.S. Appl. No. 15/494,694, dated May 7, 2019, 20 pages.
Non-Final Office Action for U.S. Appl. No. 15/494,694, dated Dec. 16, 2019, 10 pages.
Non-Final Office Action for U.S. Appl. No. 15/892,797, dated Jan. 27, 2020, 12 pages.
Notice of Allowance for U.S. Appl. No. 15/494,799, dated Feb. 24, 2020, 10 pages.

* cited by examiner

ILLUMINATION CONTROL NETWORK

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application claims the benefit of U.S. Provisional Application No. 60/913,796, filed on Apr. 24, 2007 and of U.S. Provisional Application No. 60/912,997, filed on Apr. 20, 2007. The entire teachings of the above applications are incorporated herein by reference.

BACKGROUND OF THE INVENTION

From a user perspective, the goals of lighting control are three-fold: (1) flexibility: control lighting in accordance with the user's desires; (2) ease of use: control lighting in a way that is straightforward and intuitive for the user; and (3) control lighting in a way that optimizes resource (energy) consumption. Current technologies enable control that satisfies those goals to a modest degree.

Control of lighting (illumination) and other building systems today is largely dominated by three approaches: (1) hardwired local control, such as conventional toggle light switches and dimmers; (2) hardwired local control augmented by hardwired sensors, such as motion sensing light switches; and (3) hardwired centralized control, such as systems incorporating a control computer that explicitly commands individual lights or lighting circuits to turn on, turn off, and dim. Such local controls directly accomplish the intent of the human operator who activates them. Such centralized controls allow for programmed behaviors but exercise very explicit control over operation of the individual lights. Such centralized controls also typically require detailed and explicit "commissioning" activities to program the desired operations for individual lights. Often, centralized control systems utilize protocols such as DMX512 and DALI (digital addressable lighting interface) to issue commands to individual lights.

Some technologies separate control activation (e.g., the light switch) from the controlled light or other device. An early example of this control is the X10 system, a one-way control system relying on transmission of low-frequency signals over the AC power line. A more recent example of similar technology is the Insteon system, which uses an AC signaling system like X10, but uses acknowledgments to make the protocol more reliable. Wireless systems are also used, including both proprietary wireless and industry-standard initiatives such as the Home Automation Profile of the ZigBee wireless mesh network standard, or lower-level protocols relying on the IEEE 802.15.4 standard (which also underlies ZigBee). These systems, particularly the wireless ones, can be easier to install than hardwired systems. Like the hardwired local and centralized controls that they replace, these systems typically require explicit "commissioning" activities to achieve the desired results.

Illumination produced by light-emitting diodes (LEDs) is particularly desirable both from an energy consumption standpoint (since current laboratory LEDs are the most efficient general-purpose light emitters in existence today, and they are following a clear path to further improvement) and from a control flexibility standpoint. LEDs also have significant other advantages in packaging flexibility, lifetime, size, and durability. Most current LED-based light sources for general illumination are relatively primitive, in that they incorporate no built-in control mechanisms, and simply supply the constant DC current needed to operate the LEDs, sometimes using pulse-width modulation (PWM) to adjust brightness. Some LED sources are more sophisticated, allowing dynamic adjustment of color. Such sources typically are controlled in a centralized fashion, in part because the complexity of control required for such adjustments can be difficult to express with a simple locally actuated control.

Although illumination by LEDs is advantageous from a technology and lifetime standpoint, the cost of LED illumination devices is significantly greater than conventional light sources such as incandescent or fluorescent bulbs. The very long inherent lifetime of LED sources is also at odds with the traditional distinction between permanently installed lighting fixtures and replaceable light bulbs. LED lighting is likely to be packaged as complete units, combining the fixture and light source without any intent that the source be easily replaceable. Although LED light sources can fail, such a failure can be treated as a repair, rather than as an expected and regular intervention.

Inasmuch as existing technologies for control of lighting and/or other building systems rely on localized controls or centralized controls, those technologies do not provide the degree of flexibility and ease of use that is desirable for taking full advantage of the capabilities and attributes of LED lighting.

SUMMARY OF THE INVENTION

Inasmuch as existing technologies for control of lighting and/or other building systems rely on localized controls or centralized controls, those technologies do not provide the degree of flexibility and ease of use that is desirable for taking full advantage of the capabilities and attributes of LED light sources. Their output can be readily adjusted without penalty in color, lifetime, or other areas across an enormous range of intensity. Their long lifetime makes it cost-effective to amortize the cost of control circuitry components across that lifetime. In fact, sophisticated controls are essential for achieving that long lifetime, because the brightness and color spectrum of LED emitters can change significantly over that lifetime.

The present invention takes advantage of the technical and economic properties of LED lighting sources by integrating a control microprocessor with each light source to form an illuminator. Enabling the control microprocessors in different illuminators to communicate with each other makes it possible to coordinate the behavior of a collection of illuminators. Such coordination is particularly valuable for illuminators within an enclosed space (e.g., a room), where it is desirable for plural illuminators to operate together to provide illumination that is perceived by users as being uniform and effective.

In certain embodiments, the illuminators comprise a light source, one or more sensors, at least one communications interface, and at least one processor. The light source may be a plurality of LEDs, which may comprise LEDs of at least two different colors; manipulating the emission of the different color LEDs changes the perceived color of the emitted illumination. In other embodiments, the light sources may be fluorescent, incandescent, or metal-halide light bulbs.

One or more sensors may be integrated into the illuminator to monitor such parameters as ambient light levels, ambient motion, ambient sound, and the electrical parameters of the illuminator itself. For example, the sensor may respond to the forward current of the LED, providing a measure of the power consumed by the illuminator or the expected lifetime of the LED. The sensor may also detect external stimuli such as sunlight or motion; detection of such stimuli may lead the illuminator's processor to change the illumination intensity or color. The sensor may even detect motion or voice commands.

To enable coordinated operation, the illuminators each have communications interfaces for communicating with other illuminators and with external controllers. The communications interfaces may use infrared radiation, ultrasound waves, radio-frequency waves, or signals sent over wires or fiber-optic links to communicate. In disclosed embodiments, illuminators use infrared radiation to communicate with their neighbors and wireless radio-frequency gateways to communicate with illuminators that cannot be reached with infrared links.

In the disclosed embodiments, the plurality of illuminators form a distributed network that makes coordinated lighting decisions based on the output from the sensors and the communications interfaces. The processors in the illuminators respond to these data, changing the intensity, pattern, and color of the emitted light. In one implementation, the processors respond according the a weighted polling algorithm.

The processors also communicate with fixed and handheld directors, which can be used to control and configure the illuminators directly. The directors may also be used to upload software modules, or behaviors, that influence the lighting decisions of the distributed network. Behaviors (for example, the ability to learn and replay lighting patterns) can be delivered to the control microprocessors as independent software modules. Such modules could, for example, be provided as separately purchased software upgrades for existing hardware, enabling lighting sources to provide more sophisticated functions with no change, modification, or alteration to the sources themselves.

Figure 1:
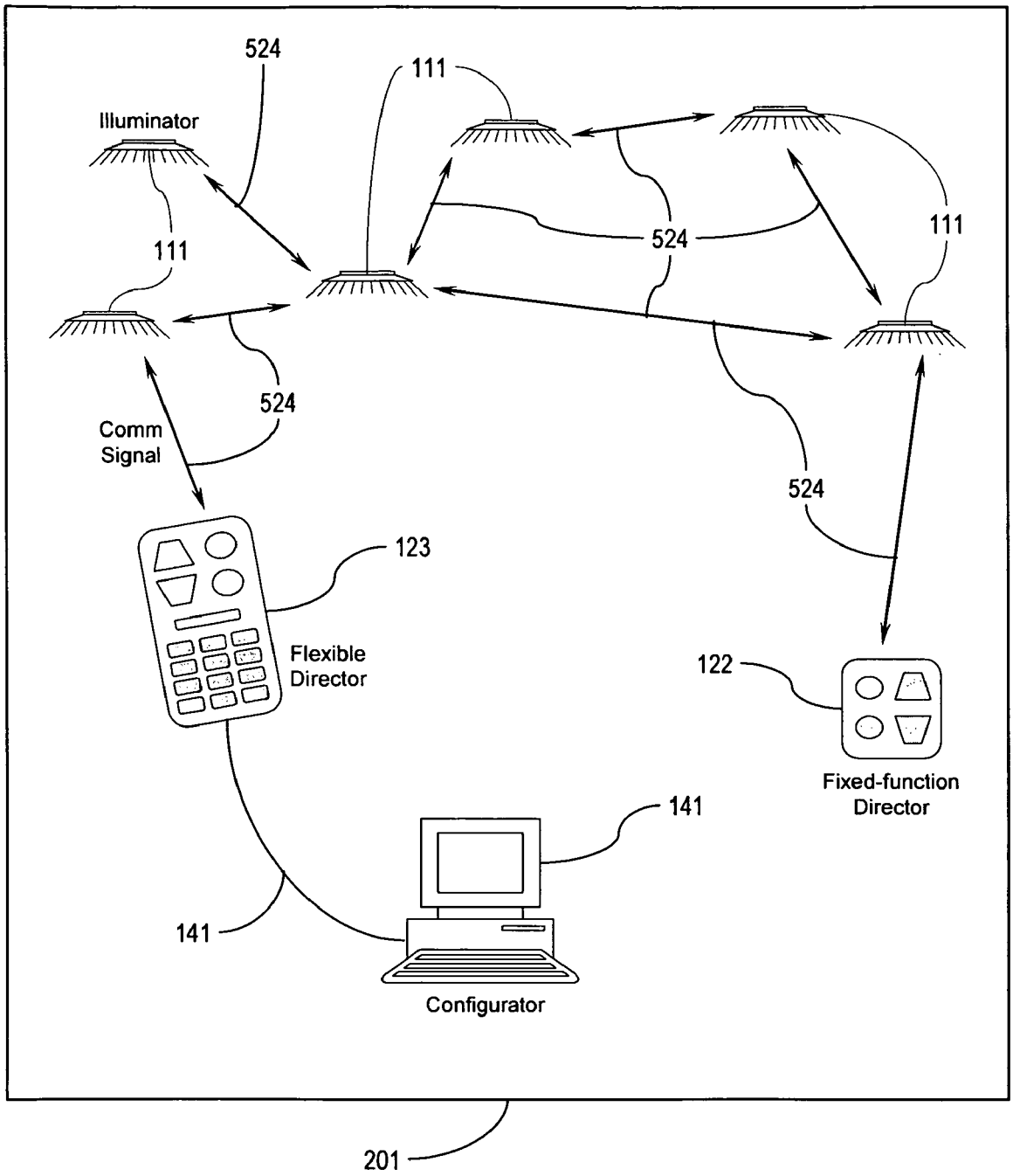
FIG. 1 shows the system architecture of a basic illuminations control network (ICN) application.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

1 Introduction

A description of example embodiments of the invention follows.

The teachings of all patents, published applications and references cited herein are incorporated by reference in their entirety.

Traditional lighting sources (such as incandescent bulbs, fluorescent lamps, metal halide lamps, etc.) can be turned on and off, but provide very little additional flexibility of control. For example, incandescent lamps can be dimmed, but only at the cost of dramatic diminution in energy efficiency and an undesirable color shift to the red end of the spectrum. Similarly, fluorescent lamps can be dimmed, but only within a limited range and through use of sophisticated high-voltage power control circuitry that is incompatible with the dimmers used for incandescent lamps. Metal halide lamps are even less practical to dim, and although highly efficient, have relatively very long startup and cool-down times. The above-cited drawbacks represent only a few of the disadvantages of conventional light sources, the overall effect of which is to limit the utility of sophisticated control capabilities.

LED light sources, on the other hand, have the capability to support much more sophisticated controls. Their output can be readily adjusted without penalty in color, lifetime, or other areas (and even with a modest improvement in energy efficiency depending on the dimming technology) across an enormous range of intensity (over 5000 to 1). Their long lifetime (100,000 hours or more) makes it cost-effective to amortize the cost of control circuitry components across that lifetime. In fact, sophisticated (internal) controls are essential for achieving that long lifetime, because the brightness and color spectrum of LED emitters can change significantly over that lifetime. Such changes are also caused by changes in operating temperature, and are the natural result of manufacturing variations: nominally identical LED components can exhibit significantly different intensities and color spectra.

Compared to most conventional light sources, LED light sources are relatively costly to manufacture. Although this higher cost is, in the long term, compensated by the greater energy efficiency and longer lifetime of LEDs, in practice the high first cost of LED lighting is a significant economic barrier to its use.

The present invention takes advantage of the technical and economic properties of LED lighting sources by integrating a control microprocessor with each light source or other controlled appliance and enabling the control microprocessors to communicate with each other to provide coordinated behaviors across a collection of light sources. Such coordination is particularly valuable for light sources within a single physical space (e.g., a room or other enclosed area), where it is desirable for multiple light sources to operate together to provide illumination that is perceived by users as being uniform and effective. With conventional control mechanisms and light sources, control might be applied (e.g., by hard-wiring or configuring all the light sources in a room to turn on and off together) to yield uniformity of lighting sources—but the real value comes from the perceived utility and effectiveness of the light for users, not for the sources.

Integrating a control microprocessor with each light source or other controlled appliance allows the controlled units to be programmed with different behaviors. Behaviors (for example, the ability to learn and replay lighting patterns) can be delivered to the control microprocessors as independent software modules. Such modules could, for example, be provided as separately purchased software upgrades for existing hardware, enabling lighting sources to provide more sophisticated functions with no change, modification, or alteration to the sources themselves.

The economic characteristics of LED lighting (long lifetime, high initial cost) encourage the use of different economic models than for conventional light sources. For example, it may be more cost-effective for a customer to lease LED lighting fixtures (thus ensuring continuing access to maintenance) than to purchase them. The present invention provides for software to control and enforce such leasing, by establishing a continuing electronic relationship between the supplier and customer.

The present invention describes an architecture for controlling the operation of light sources and/or other appliances. The architecture provides for self-organizing autonomous control: a system in which elements such as LED light sources communicate and interact with each other to provide behaviors appropriate to the environment in which they operate, based on minimal human interaction and configuration. The system learns the desired behavior by responding to human requests and modifying its behavior in response to those requests. One aspect of the idea is that behaviors can be defined by independently loadable software modules that are installed on a within the system elements so that an individual element can exhibit a wide variety of behaviors.

One goal of the Illumination Control Network (ICN) architecture is to combine the many advantages of light-emitting diode (LED) light sources with the additional capabilities provided by integrating local digital microprocessor control into each light source. LED light sources offer major energy efficiency improvements relative to conventional sources, and the combination with autonomous distributed control can further reduce energy costs by ensuring that light is produced only when actually needed. In addition, once such a control mechanism is present, the same control, sensor, and communication facilities can enable a wide variety of other functions for behavior customization, system control, and integration with building management and security systems. In addition, since the control platform is built around a general-purpose microprocessor running an arbitrary set of software modules, the system's control, sensor, and communication functions of the system can also be used to control arbitrary other types of devices, and to provide transport for other types of data.

2 Architectural Components

FIG. 1 shows an example ICN implementation comprising plural illuminators 111, a fixed-function director 122, a flexible director 123, and a configurator 141. All these elements are installed and/or operated within the confines of a room 201. These elements communicate with each other by sending messages with infrared communication signals 524.

There are many possible designs for illuminator 111, depending on the amount of light to be produced, power sources (e.g., AC line, DC, battery), thermal considerations, and control requirements. Although this description focuses on LED-based illuminators, it is of course possible to use other light sources such as incandescent, fluorescent, halogen, and/or high-intensity discharge, although some control behaviors may not be practically realizable with such non-LED light sources.

Figure 2:
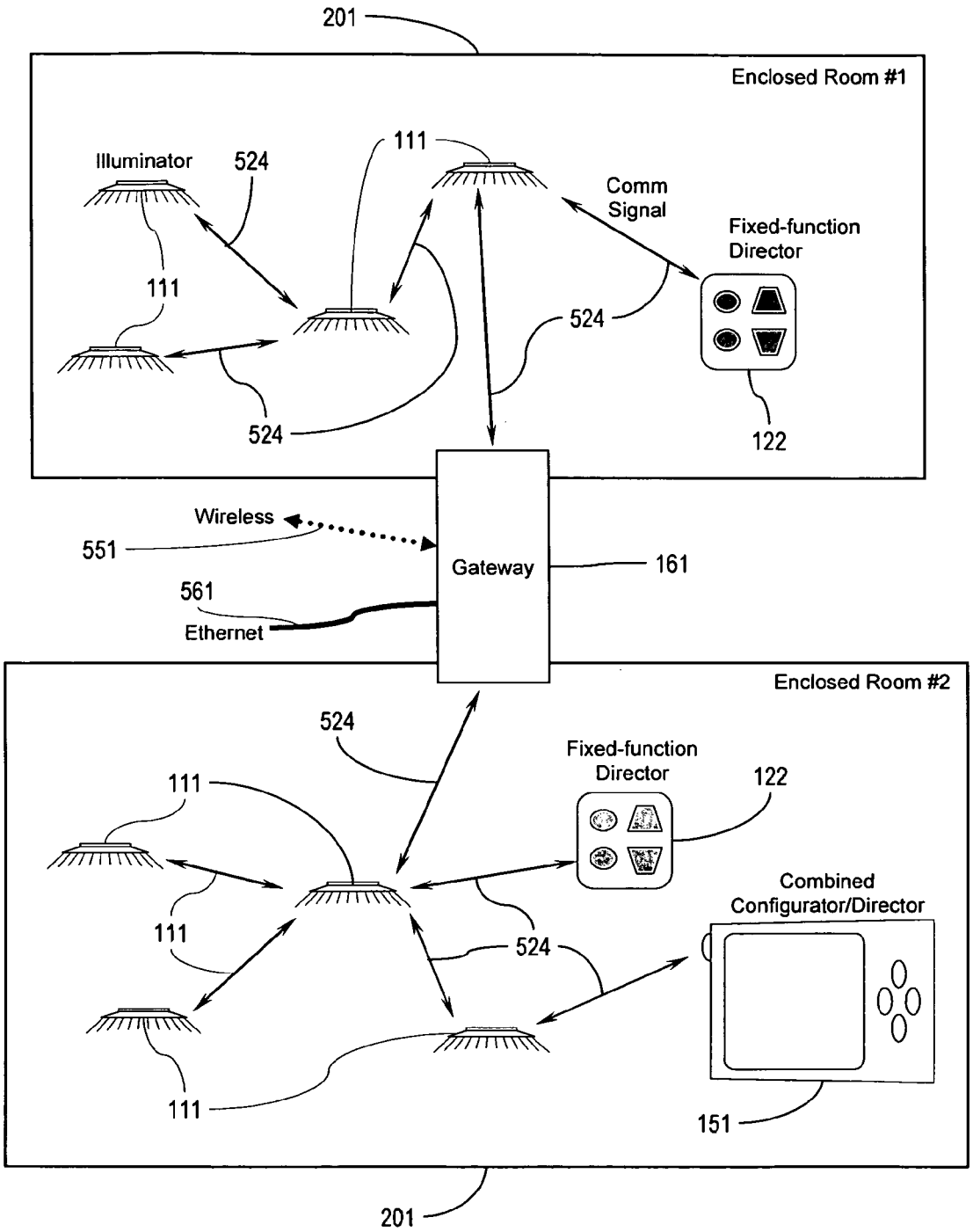
FIG. 2 shows additional system components that can be integrated with the basic application shown in FIG. 1.

FIG. 2 shows a more complex example ICN implementation consisting of plural rooms 201, optically isolated from each other by opaque room walls, each containing plural illuminators 111. In FIG. 2, combined configurator/director 151 takes the place of configurator 141 and flexible director 123. Fixed-function directors 122 are present in each of rooms 201. Gateway 161 enables communication between different rooms 201, which would otherwise block infrared control messages 524 with their opaque walls. Gateway 161 can also incorporate other communication interfaces, such as wireless signal 551 or Ethernet interface 561.

Figure 3:
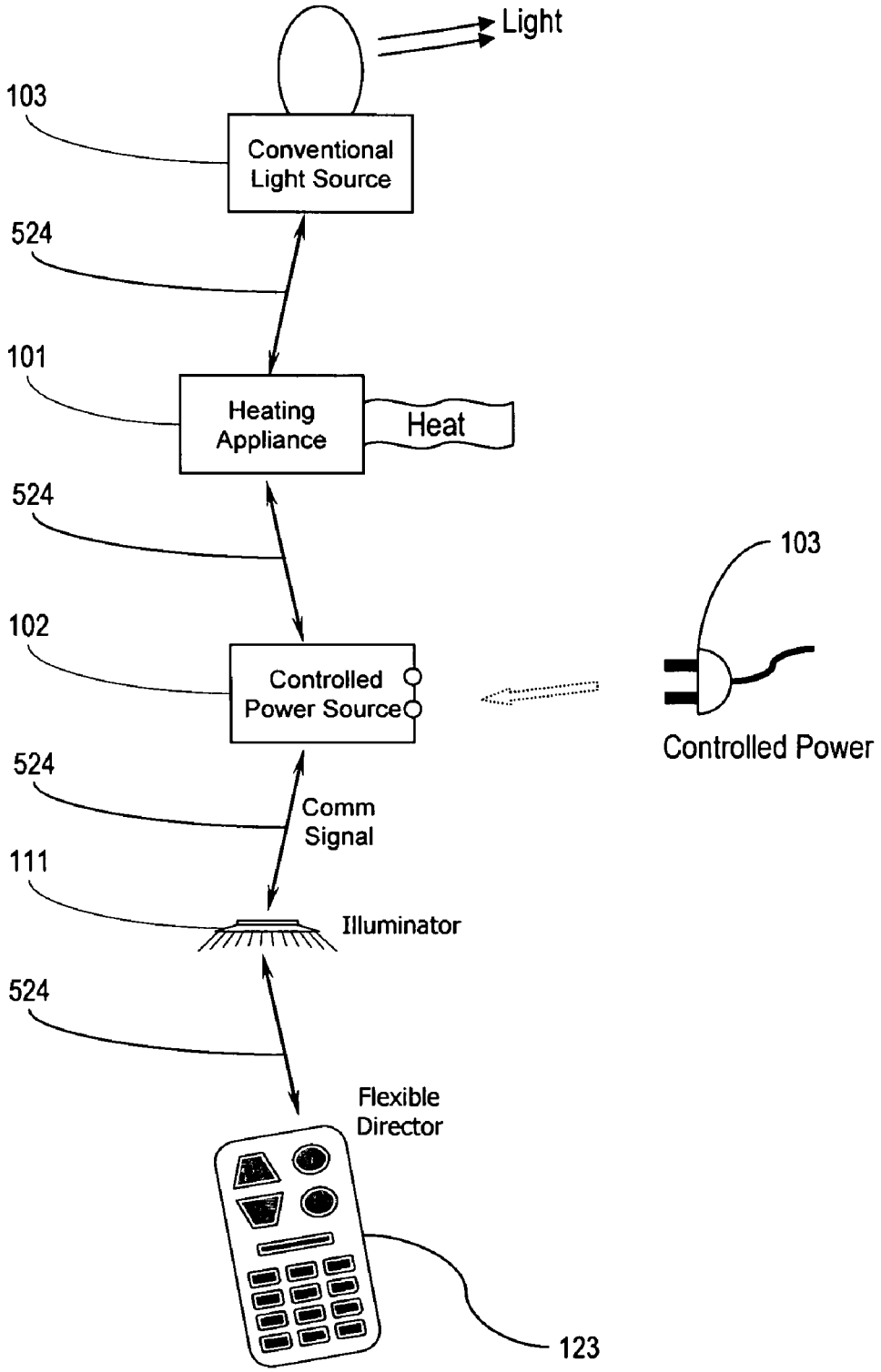
FIG. 3 shows applicability of ICN control techniques to other types of device.

As is evident from the description herein, FIGS. 1 and 2 are only examples of potentially arbitrary combinations of elements in an ICN implementation. Because light sources provide an easily-understood target for ICN control capabilities, they are used in most examples here. However, illuminator 111 is simply one type of appliance 101 that can be controlled with ICN control capabilities. As shown in FIG. 3, flexible director 123 can be used to control arbitrary entities, such as illuminator 111; controlled power source 102 which supplies power to an arbitrary electrical device through conventional power plug 103; controlled appliance 101, which in this case is shown as a heater; conventional light source 104; and/or other devices incorporating the ICN control mechanisms, all of which can receive instructions through control messages 524. Directors 122 and 123 are examples of the collective class director (not shown in the figures). Combined configurator/director 151 combines the functions of configurator 141 and director 121 in a single component.

Directors 121 are primarily responsible for delivering requests to controllers. A director can also deliver new behavior modules 801 to controllers and receive reports back about controller operation and about the device(s) it manages. Directors 121 can range from very simple (e.g., fixed-function director 122, which may be a wall-mounted switch that only requests illuminators to turn on and off) to relatively sophisticated (e.g., flexible director 123 which is a handheld remote control that can control, configure, and interrogate arbitrary controllers 301).

Configurator 141 is typically a graphical software interface run on a commodity computing platform (e.g., desktop PC, laptop, or handheld computer) for designing and configuring behaviors. Such an interface allows a person to use familiar tools and imagery to specify device behavior in a user-friendly manner, and then load the behavior into director 121, which can configure controllers 301 to exhibit that behavior.

Functions of configurator 141 and director 121 are logically distinct: configurator 141 designs—a relatively rare activity—and director 121 controls—something done as a natural part of daily activities. Often, they will be physically distinct: a common implementation would have configurator 141 as software on a desktop or laptop PC, where it would communicate with a director over USB cable interface 142. The functions of director 121 and configurator 141 can also be combined as combined configurator/director 151, for instance in a hand-held computer such as PDA that also includes an interface that can communicate with controllers 301. A set of controllers 301 forms a local area network that may be inherently limited in scope by the type of communication interfaces used by controllers 301. Such networks may be connected to each other, or to the internet, through additional communication interfaces and/or gateway elements that transfer data among multiple such networks, and/or between ICN networks and other networks.

Part of every controlled appliance 101 in the ICN architecture is controller 301. Most types of appliance 101 also incorporate some actual function to be controlled, such as illuminator 111 which comprises both controller 301 and light sources. In the limiting case, appliance 101 may simply control power delivery to some other entity, as in the case of controlled power source 102.

2.1 Controller

Figure 4:
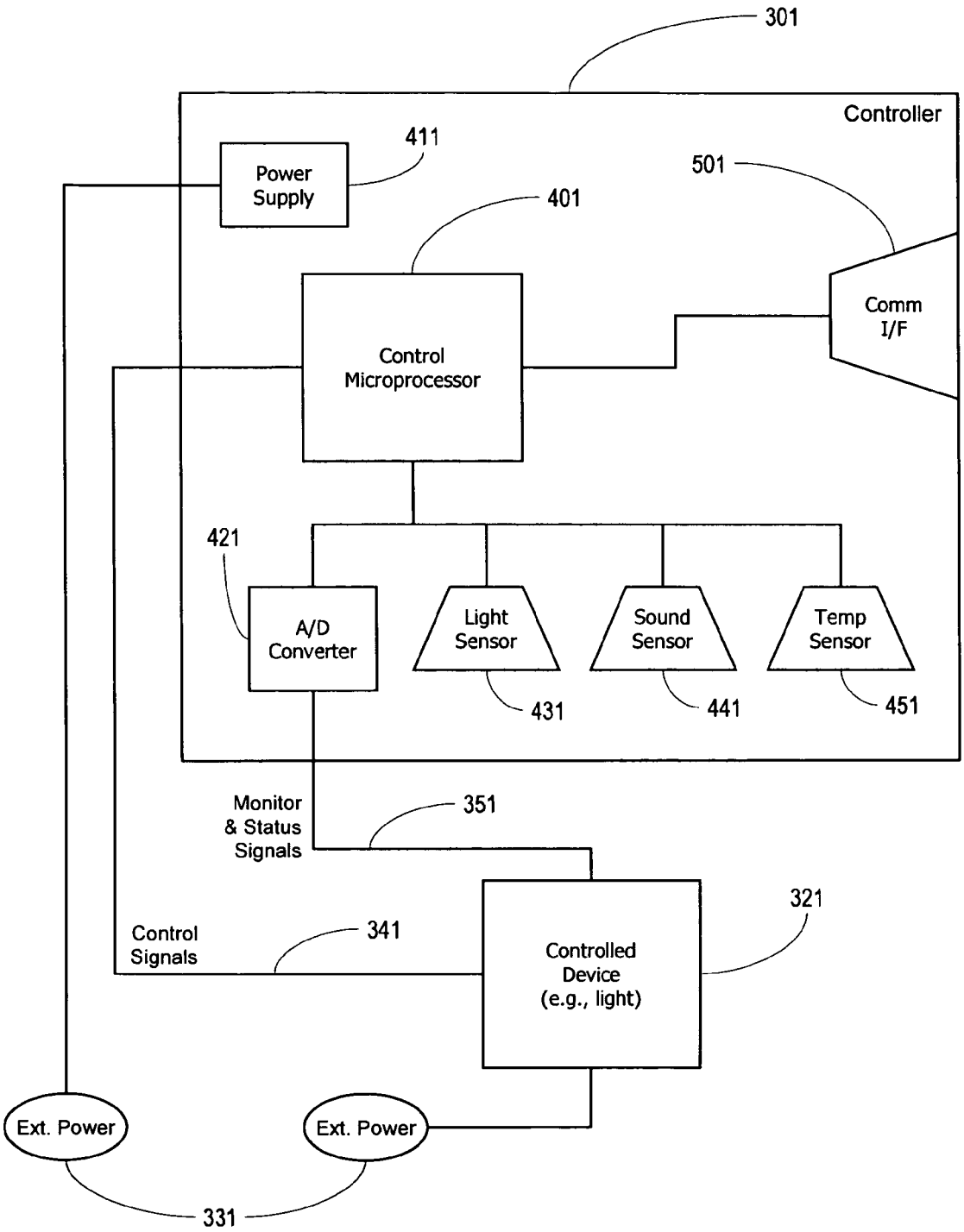
FIG. 4 shows the elements of an ICN controller.

As shown by the example configuration in FIG. 4, controller 301 comprises control microprocessor 401, optionally in combination with some and/or all of power supplies 411, analog-to-digital converters 421, light sensors 431, sound sensors 441, communication interfaces 501, and/or other interfaces, sensors, actuators, or mechanisms that enable controller 301 to interact with its environment, of any of which which plural instances may included in controller 301. Controller 301 and controlled device 321 are supplied with electrical power from external power supplies 331. Power supplies 331 may be distinct for controller 301 and controlled device 321 as shown in the example, or may be identical. Power supply 411 serves the conventional function of transforming externally-supplied power from power supply 331 into the form (a) required by the internal components of controller 301.

Control microprocessor 401 runs software modules called behaviors (section 3 describes a variety of examples) that are loaded into internal memory of controller 401 and that may be subsequently replaced, updated, and/or adjusted. Behavior modules 801 that are running in a controller determine both how it responds to requests and what functions it performs autonomously, for example in response to time-based or sensor input triggers. Controller 301 includes communication interfaces 501 that allow it to communicate with directors 121 and with other controllers 301 (in other appliances 101 such as illuminators 111).

Controller 301 typically interacts with controlled device 321 through control signals 351, which provide control inputs to the device. Controller 301 typically monitors status and operation of controlled device 321 through status signals 341, which typically are analog voltages or currents that are converted to digital form through analog-to-digital converter(s) 421, although other sensors or interfaces may be used, including digital interfaces of control microprocessor 401. It will be recognized by those skilled in the art that analog-to-digital converter(s) 421 may be integrated with control microprocessor 401, as may other interfaces and sensors.

Although controller 301 can be used in a stand-alone manner, simply controlling power for an arbitrary electrical device, more typically controller 301 is integrated into an other electrical device, such as a light source or appliance. Illuminator device 111 is the integration of controller 301, including appropriate sensors, with an LED light source. Because the ICN architecture is particularly well-adapted to controlling lighting, this description uses illuminator devices to explain and provide examples of ICN functions.

Controller 301 typically requires a small amount of power to operate, distinct from the power consumed by the device(s) that it controls. It is often desirable for this power supply to be continuously available, even though external power may be completely disconnected from the controlled device. In such cases, controller 301 can incorporate battery power. Power supply 411 is responsible for converting external AC or DC power input, and for managing battery power, to voltage levels more suitable for control microprocessor 401 and other controller components.

Controller 301 is fundamentally a software-controlled device. Control microprocessor 401 controls and monitors the operation of controlled devices (such as LED emitters 701) based on the behavior software modules 801 that have been loaded into it, and also performs communication, power management, and device management functions. It will be evident that the function of control microprocessor 401 could be performed by multiple microprocessors, possibly of different types, for example to allow use of simpler and less microprocessors to perform some simpler but time-critical functions and using a more powerful microprocessor for the more complex behaviors. Control microprocessor 401 incorporates processing capabilities, temporary (operational) storage, and non-volatile storage; it will be evident these elements of control microprocessor 401 may be integrated in a single semiconductor component (which typically is the most cost-effective approach) or may be implemented as separate components.

Controller 301 typically incorporates one or more communication interfaces 501 for communicating with directors 121 and controllers 301 in other system elements. The ICN communication protocols can be carried over a wide variety of physical interfaces, including infrared, ultrasonic, radio, power line modulation, light modulation, etc. Communication interface 501 typically supports two-way and symmetric communication, but a one-way communication such as X10 power-line modulation, voice recognition, or simple infrared remote control can be used for simple control functions.

Controller 301, particularly when used for controlling a lighting device, typically incorporates one or more light sensors 431 for measuring light intensity. These sensors can be used for feedback control of lighting intensity based on other ambient illumination (e.g., daylight) as well as for compensation for changes in light output intensity. Multiple light sensors 431 may be used for different purposes, such as measurement of ambient light, measurement of light reflected from an illuminated surface, and/or direct measurement of LED light output. Light sensors 431 may incorporate spectral filters to allow for measurement of spectral characteristics of LED output.

Controller 301 may incorporate one or more sound sensors 441 (microphones). These sensors may be used to enable voice or sound-activated control of the device, as an input to be considered in occupancy sensing control, and/or as part of an ultrasonic communication and/or location-mapping function.

Controller 301 may incorporate one or more temperature sensors 451 to measure ambient temperature. Temperature sensors can be used to adjust device performance or to trigger specific behaviors, such as illumination or blinking to indicate when ambient temperature has gone out of range, and/or delivery of status messages to other system components.

Controller 301 typically incorporates several voltage-measurement sensors (analog-to-digital converters 421) that allow control microprocessor 401 to monitor relevant aspects of the operation of appliance 101, such as power consumption and/or LED junction voltage drop. Junction voltage drop can provide a measurement of junction temperature, which in turn can be used for feedback control and lifetime monitoring.

Controller 301 may incorporate one or more infrared or other types of motion sensors 461 (shown in FIG. 5), in order to support control behaviors such as occupancy sensing and response. Such sensors can generate an electrical signal that it is interpreted by the control microprocessor to identify potential motion.

Controller 301 may incorporate one or more video/image sensors (connected similarly to motion sensors 461) that can be used to support behaviors such as occupancy sensing and response. Such sensors can generate pixel image that is processed and interpreted by control microprocessor 401 to identify potential motion. An image sensor could include optics such as a fish-eye lens to allow coverage of the full field visible from the device.

2.2 LED Illuminator

Figure 5:
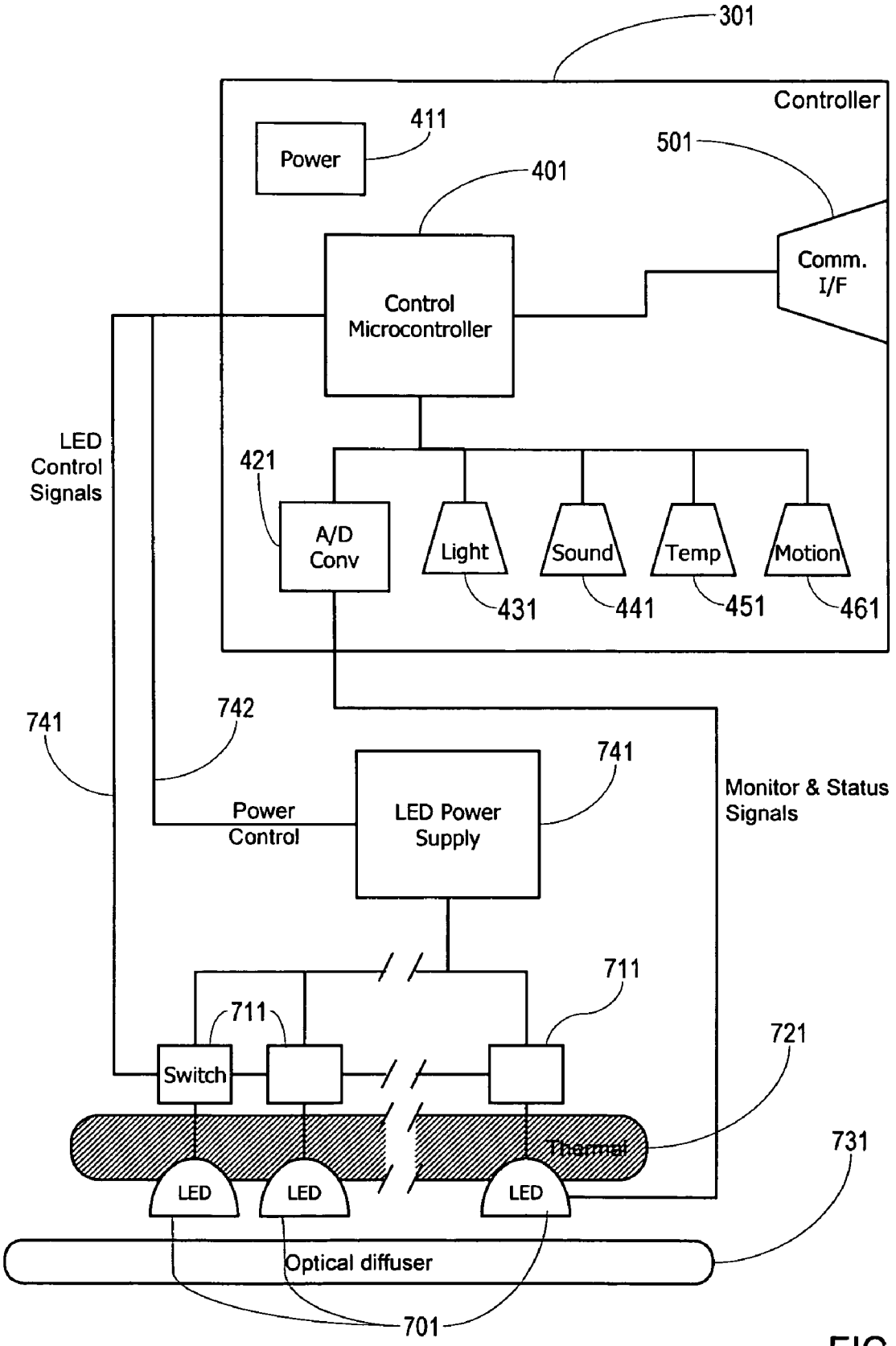
FIG. 5 shows an ICN controller integrated with an LED lighting source.

FIG. 5 shows an example implementation of LED illuminator 111. It incorporates plural LEDs 701, which may emit different colors and/or include different phosphors to produce different color distributions. LEDs 701 may be all the same (e.g., white LEDs using phosphor technology), multi-color for mixing applications (e.g., red/green/blue or red/blue/green/amber), or predominantly white with additional colors (e.g., red, green) to mix for small adjustments to color fidelity and/or color temperature.

LEDs 701 are mounted on thermally dissipative mounting substrate 721, which conducts generated heat away from the LEDs and reduces their junction temperature. Heat transfer is preferably passive (e.g., through convection or by conduction to the illuminator housing, heatsinks, heat pipes), although active heat removal (e.g., fans, piezoelectric air movers) may also be employed.

LEDs 701 produce light output that is filtered through optical diffuser 731, which produces a uniform beam output by mixing and diffusing the outputs of individual LEDs 701. Because the output patterns of LEDs are directional, illuminator 111 typically contains reflector and/or diffuser assemblies to combine the output of the LEDs and provide a more uniform appearance. Mixing and uniformity can be particularly beneficial when combining LEDs with different color outputs as opposed to combining outputs from multiple LEDs with similar color spectra, although in some applications (for example, reflected rather than direct lighting) an explicit optical mixing component may not be required. Optical diffuser 731 can also form the light output into a more desirable beam pattern that may differ from the native output pattern of the LEDs.

LEDs 701 are individually controlled by metal-oxide-semiconductor field-effect transistor (MOSFET) switches 711, which are connected to shunt the current passing through each LED to turn the LED off in the MOSFET's low-resistance state, or to allow the LED to illuminate in the MOSFET's high-resistance state. LED control signals 741 driven by control microprocessor 401 determine the state of the LEDs. These control signals may be modulated very rapidly using pulse-width modulation or similar techniques to achieve intensity and color control. LED power supply 421 provides constant-current DC power to operate the LEDs. Power control signals 742 driven by control microprocessor 401 determine the current level and operating state of power supply 421 (which may be turned completely off when no illumination is desired, to reduce system power dissipation to a minimum level. Analog-to-digital converter 421 can be used to monitor forward voltage drop of LEDs 701, to allow accurate inference of LED junction temperature in support of intensity and spectrum control, as well as lifetime prediction and identification of failed components. Analog-to-digital converter 421 can also be used to monitor system power consumption for energy usage status reporting. Light sensor 431, sound sensor 441, temperature sensor 451, and motion sensor 461 can be used to provide inputs for intensity management, occupancy sensing, and other control functions. Communication interface(s) 501 enable controller 301 to communicate with other controllers. Not shown in FIG. 5, but evident to one skilled in the art, is that power supply 411 and power supply 741 would supplied from external power source 331, and could be combined in a single component if convenient.

Power supply 741 converts available power from one or more external power sources (e.g., AC line current, low-voltage DC supply, battery power) into the current-regulated or limited voltages required by the LED emitters. Power supply 741 may incorporate both a power conversion function and an LED control function (e.g., switching the MOSFETs 711), the former function being responsible for converting raw input power to more easily manageable (e.g., DC, lower-voltage) form, and the latter function providing adjustable output current and/or the ability to modulate the output with pulse width or other techniques. In an illuminator with several LED emitters, power supply 741 may produce multiple independent current-regulated outputs for powering larger numbers of LEDs 701 than is practical from a single output. Multiple outputs may provide also greater failure tolerance and redundancy.

Depending on the intended application, illuminator 111 is typically designed to provide light with specific color characteristics. Sometimes it is desirable for color characteristics to be adjustable, but in other cases fixed output is acceptable. The simplest is the fixed white color: using phosphor-based warm white or cool white LEDs, such an illuminator produces a single color spectrum of white light output. The intensity, but not the color, of such a source may be adjusted. A more sophisticated type of illuminator 111 may employ a mix, primarily of white LEDs and a limited number of color, to allow the color spectrum to be adjusted dynamically (e.g., switching between the warm white produced by incandescent sources and the cool white characteristic of daylight. Finally, illuminator 111 may be designed to produce any color through use of multiple colored LEDs and color mixing. Combinations such as red/green/blue or red/green/blue/amber are frequently employed; the more colors that are available, the greater the variety of high-quality colors that can be produced.

Although LEDs are a particularly effective light source, it is also possible to control other light sources with essentially the same architecture as the LED-based illuminator shown in FIG. 5. For example, the controller function of an illuminator could be combined with any combination of LED, incandescent, fluorescent, high-intensity discharge, or other light sources. The functions of controller 301 can also be packaged separately and used to control power for arbitrary other devices including, for example, stand alone lamps or appliances.

2.3 Director

Director 121 is used to send requests to one or more controllers 301, deliver behavior modules 801 to controllers 301, and/or to receive status reports from controllers 301. In concept (and often in appearance), director 121 is quite similar to a conventional infrared remote control such as might be used with a television set. However, unlike such controls, which only transmit signals and do not receive them, director 121 typically uses a two-way communication protocol to interact with controllers 301 and other directors 121, just as controllers 301 do to interact with each other. This two-way protocol uses acknowledgments and retransmission to allow the director to perform more reliably, and to perform more sophisticated functions, than a conventional remote control. Colloquially speaking, the purpose of director 121 is to request specific functions from controlled appliances 101.

Typically, director 121 includes a control microprocessor, at least one communication interface (e.g., infrared, ultrasonic), and one or more human operator interfaces (e.g., buttons, knobs, switches). Director 121 may also include a display to allow the operator to view the response to a request and/or to review and/or observe details of a request. The examples described herein are based around two types of director, the simple fixed-function director 122 and the more powerful and sophisticated flexible director 123. It will be evident to one skilled in the art that these distinctions are arbitrary, and that the functions that might be performed by director 121 can be packaged in a virtually limitless variety of packages and configurations (including the combined configuration of configurator/director 151). The two examples here are illustrative, not constraining.

Figure 6A:
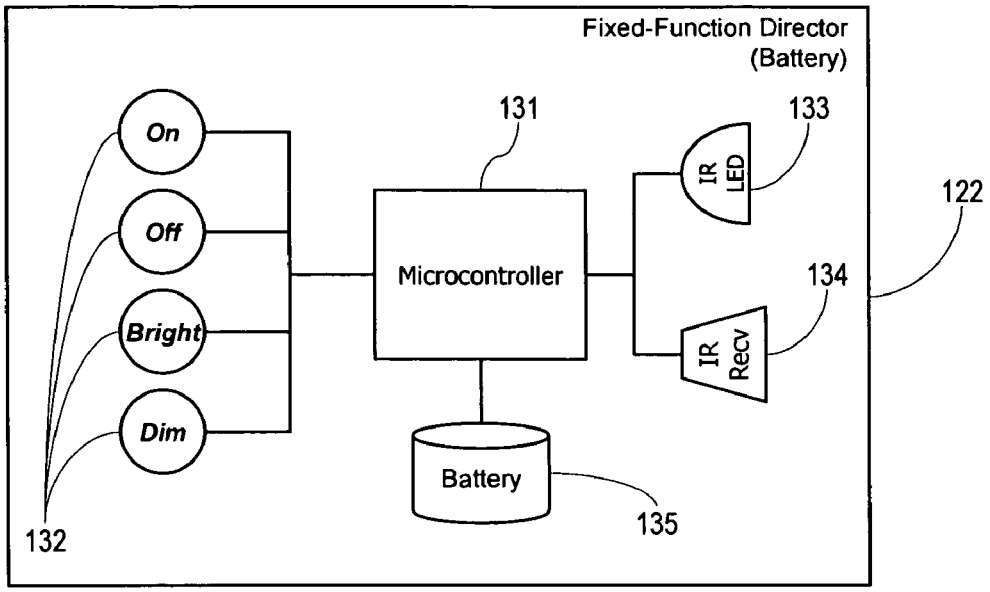
FIG. 6A shows components internal to a battery-powered fixed-function director

Fixed-function director 122 is very simple, typically used as a "lightswitch replacement". As shown in FIG. 6A, one embodiment of fixed-function director 122 consists of plural operator interface buttons 132, used to indicate the intended function, connected to microcontroller 131. Communication with controllers 301 is provided, in this embodiment, through an infrared link with a communication interface consisting of infrared transmitted 133 (typically an infrared LED) and infrared receiver 134 (typically a photodiode). Battery 135 provides operating power.

Fixed function-director 122 would often be wall-mounted, although it can be placed in other housings and does not require a fixed mounting. As operator input interfaces, it has one or more switches or sliders that mimic the appearance and operation of a conventional light switch or dimmer switch. Fixed-function director 122 would typically be programmed, by some configurator 141 or by direct interaction with some illuminator 111, to interact with a designated illuminator 111 or group of illuminators 111, as its intended purpose is to provide the same capabilities as a conventional lightswitch: direct control of specific lighting sources. A difference between fixed-function director 122 and a standard lightswitch is that fixed-function director 122 does not require any dedicated wiring to connect it to the devices (e.g., illuminators 111) that it controls, since it uses an ICN wireless communication interface, and that it can be reprogrammed to alter the association it has with designated devices illuminators, or even reprogrammed to change its basic functions.

Fixed-function director 122 may use a one-way (unacknowledged) communication protocol to communicate with controllers 301, since there is typically direct feedback to the operator about whether the message was delivered, and the request can be repeated easily by the operator (e.g., if the lights do not illuminate, press the "on" button again). One reason to use a one-way communication protocol is to minimize energy consumption by fixed-function director 122. A low-power implementation could use a long-life lithium battery, consuming little enough current that the battery would discharge no more rapidly than with no load at all.

Figure 6B:
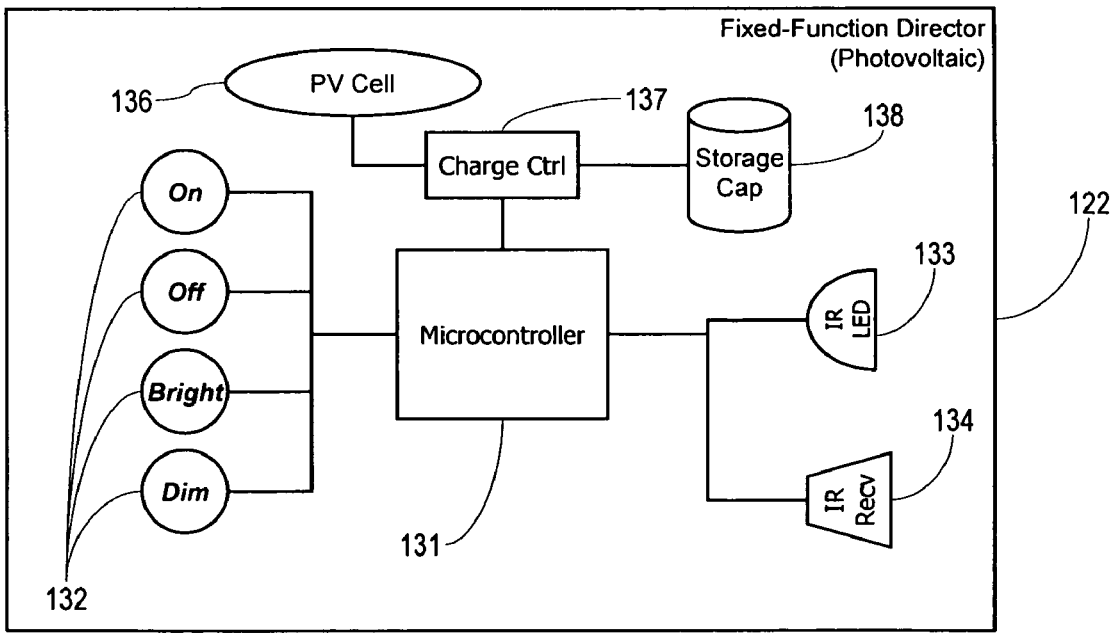
FIG. 6B shows components internal to a photovoltaic-powered fixed-function director.

Alternatively, as shown in FIG. 6B, an alternate embodiment for low-power implementation could use photovoltaic conversion (of ambient light) to store sufficient energy to send a small number of messages. This embodiment consists of plural operator interface buttons 132, microcontroller 131, infrared transmitter 133 and infrared receiver 134, but substitutes photovoltaic cell 135, charge control circuitry 137, and storage capacitor 138 for battery 135 used in FIG. 6A. Ambient light strikes the photovoltaic cell, producing voltage that is routed through charge control circuit 137 to capacitor 138. Charge control circuit 137 (for example, a Texas Instruments TPS61200 converter) converts the photovoltaic voltage to a level suitable for operating microcontroller 131 and stores it in capacitor 138.

A further alternate embodiment could use electromagnetic generation powered by the mechanical operation of the control input to the unit: moving a switch can generate enough power to generate the required message. The availability of ultra-low power microcontrollers such as the MSP430 series from Texas Instruments makes such low-power approaches plausible.

Fixed-function director 122 can also be connected directly to the external power source, and communicate with radiofrequency modulation over the power line.

Figure 7:
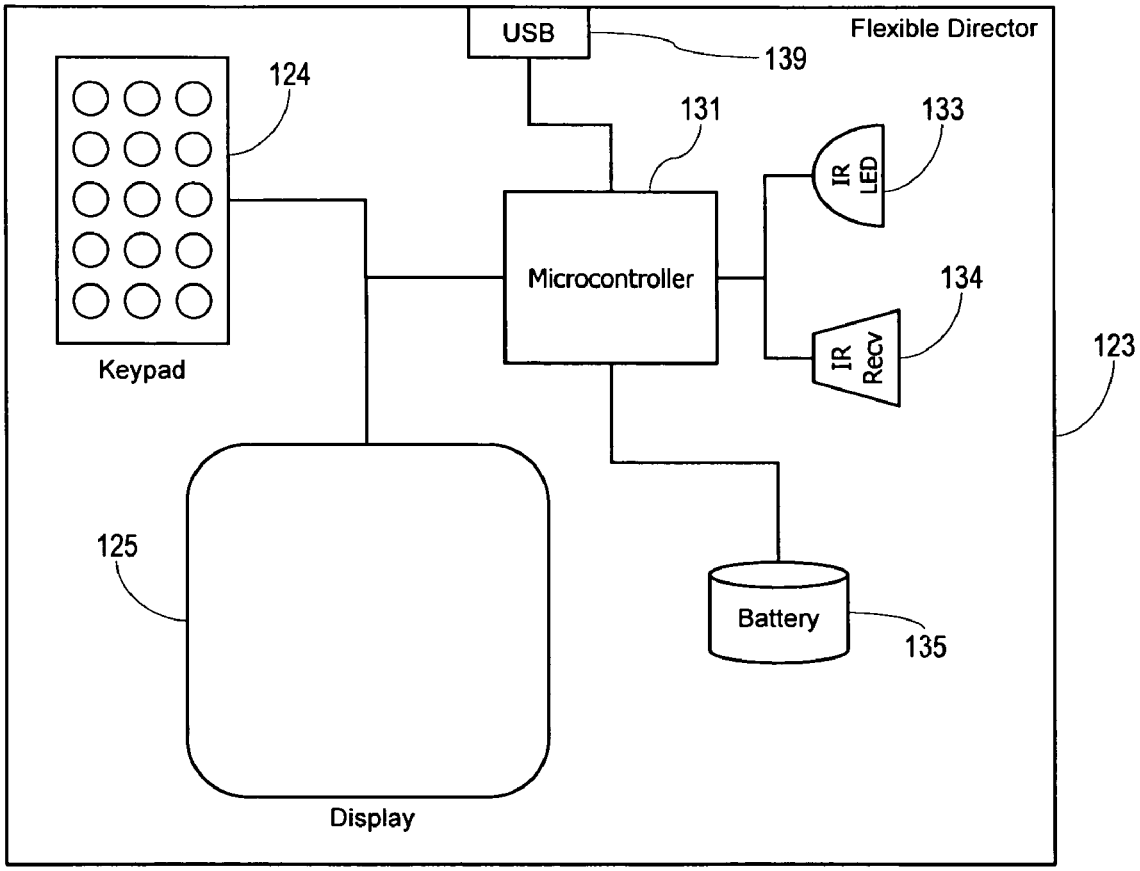
FIG. 7 shows components internal to a full-function director.

Another type of director 121 is flexible director 123, shown in FIG. 7. This device is physically similar to a sophisticated handheld remote control: it may includes multiple buttons and/or knobs for its operator interface shown as keypad 124. It typically also includes display 125 to allow the operator to see responses send in return to requests by flexible director 123. Its communication interface is typically capable of operating directionally so that the operator can point it at a specific illuminator 111 to direct requests to that illuminator alone (which, of course, may forward the request to other illuminators in a group or groups). Control microprocessor 131 in flexible director 123 typically has sufficient memory both for the director's own software and for storing behavior modules 801 to be delivered to illuminators. Flexible director 123 typically also includes USB interface 139 or other computer-oriented interface to allow it to be updated by configurator 141. Other components in flexible director 123 (infrared transmitter 133, infrared receiver 134, battery 135) serve the same purpose as in fixed-function director 122. An alternative embodiment of flexible director 123 employs a handheld computer equipped with appropriate infrared transmitter 133 and infrared receiver 134 perhiperals and appropriate operating software.

2.4 Configurator

Configurator 141 is a software application, running on some hardware platform, that is used to design behaviors. It provides a rich, user-focused graphical interface that allows the user to describe the desired behavior of a set of controllers 301 (e.g., those contained in illuminators 111).

After designing the behaviors with configurator 141, the user then typically transfers the resulting behavior modules 801 into some flexible director 123. Flexible director 123 can then be used to deliver the specified behaviors to some controller 301, which would then, as appropriate, use its communication interface to ensure that the behavior modules 801 are delivered to all controllers 301 that require them.

The ICN architecture explicitly allows the functions of configurator 141 and director 121 to be implemented independently, because that corresponds to a common usage model: an operator could use the powerful graphical interface of configurator 141 running on a personal computer to design or adjust lighting behaviors for a space, but that task would typically be performed rarely. In normal operation, minor behavior adjustments and explicit light settings could be performed with a more convenient flexible director 123 device.

However, in some applications, it is more appropriate to combine the functions of director 121 and configurator 141. For example, an operator managing an entire building's lighting, or obtaining status information for a large area, may use a combined configurator/director 151 unit, which could be portable (such as a Tablet PC or Palm Pilot device) or in a fixed location. In such applications, additional communication gateway components might be employed, for example using standard network, wired, or wireless communication from the operator's computer system to reach a communication gateway component 161 in the areas where targeted controllers 301 are present. Such gateway components could be particularly helpful when an existing building management system (e.g., based on the ZigBee or LONWorks protocols) is present; alternatively, it is possible to build controllers that incorporate those communication interfaces directly and to use them the communication among ICN components.

It will be evident that although a graphical interface for configurator 141 may be desirable to optimize the interface for ease of use, other interfaces for specifying behaviors and parameters may also be employed. For example, a scripting or other computer language may employ keywords, variables, values, and other common computer language elements to specify configurations, and in fact multiple different computer languages could be employed in different applications or together in a single application. Multiple different graphical interfaces may also be employed for different applications or in combination with each other or with language-based interfaces. Graphical and other interface techniques provide a wide variety of ways to approach interface designs.

3 Illuminator Behaviors

Because it is a software-controlled device, illuminator 111 can be programmed to perform a wide variety of functions. A variety of such functions is described below, using illuminator 111 as the example embodiment. It is understood that activities attributed to illuminator 111 are in fact carried out by the controller 301 component of illuminator 111, employing software running on control microprocessor 401 component of controller 301.

It will be evident that many of these behavior functions are also applicable controllers that operate non-LED or non-lighting devices, but as LED lighting provides a particularly rich scope for defining useful behaviors, all the examples in this section are described in terms of LED-based illuminators.

3.1 Direct Control

Illuminator 111 may respond to requests (e.g., from director 121) that instruct it to perform specific functions. A typical set of direct requests accepted by illuminator 111 could include:

- "on"—Turn the light source on
- "off"—Turn the light source off
- "set level XX %"—Set the intensity of the light source to the specified value
- "brighter XX %"—Increase the light source intensity by specified increment
- "dimmer XX %"—Decrease the light source intensity by specified increment Many additional requests may be accepted, depending on the capabilities of illuminator 111 and director 121. Additional requests would be used to enable capabilities discussed further below.

Direct requests may be combined in a single request message. For example, a request might combine "on" and "set level 100%" to turn on the light at maximum intensity.

Brightness may be adjusted using pulse-width modulation or related techniques. Brightness may also be adjusted by changing the current delivered by LED power supply 741. Reduced current increases LED lifetime and reduced junction temperature, but it may also cause color shifts in LED output which would require compensation in order to maintain uniform color.

3.2 Group Control

Illuminator 111 may be part of a group of illuminators that all are intended to respond similarly. To accomplish this, communication interface 501 can be used to pass on the requests from one illuminator to others, until all members of the group have been informed of the request. To ensure reliable transfer, positive acknowledgement would typically be part of such a communication protocol.

The simplest application of group control is to have all the illuminators in a group respond to direct control requests. However, group control assists in providing many of the other behavior functions when multiple illuminators are involved, as it allows illuminators to cooperate in exhibiting similar behaviors.

Illuminator 111 can be manually assigned to groups using director 121. The director can instruct a given illuminator 111 that it is to belong to a designated group or groups or, alternatively, that it no longer belongs to a designated group or groups.

Preferably, illuminators 111 can associate into groups autonomously, based on the ability to communicate with each other, using conventional distributed processing algorithms. Since the preferred mechanisms (e.g., infrared, ultrasound) for communication interface 501 are generally localized to a single open (that is, they are blocked by walls and doors), the illuminators in such an area can identify themselves to each other and form a group based on reachability.

Illuminator 111 can adjust the intensity or strength of its communication transmissions, and/or the sensitivity of its communication receiver, to dynamically adjust the distance over which group detection takes place. For example, a newly-installed illuminator could start at low communication power/sensitivity to locate nearby neighbors, and incrementally increase its communication range to larger areas to obtain a more complete picture of its neighbors.

Autonomous group membership determination will typically take place when a set of illuminators is installed and powered on for the first time. To ensure that group membership is determined in an orderly manner, the illuminators can implement group membership and quorum protocols of the sort commonly used in distributed computing systems.

Each illuminator 111 can belong to multiple groups, allowing requests received by a particular illuminator to have different scope depending on the group or groups to which they are addressed.

Because different illuminators can have plural communication interfaces, the scope of a group can extend beyond that of a particular communication mechanism. An installation may also include explicit gateway 161 components that use additional physical communication mechanisms to transfer communication messages across boundaries (e.g., through walls or floors) that would otherwise not be reachable. For example, in a large building, all the illuminators 111 might belong to a single "maintenance" group, used to collect status information, even though ordinary functions (such as direct control) would typically be processed only within smaller groups (such as all the illuminators in a particular office space).

3.3 Timed Control

Illuminators 111 can keep track of the date and time of day and exhibit behaviors triggered at specific times. For example, an illuminator (or group of illuminators) can be requested to turn on at the beginning of the business day and off at the end of the day. As another example, a more sophisticated time-based behavior would be to emulate sunrise (i.e., become gradually brighter over a period of an hour) to provide a gentle wakening experience.

Illuminators 111 can be informed of the current date and time by director 121. Director 121 can similarly be informed of the time by configurator 141, which can obtain accurate highly accurate time from network time references, for example by using the Network Time Protocol (NTP) or the Simple Network Time Protocol (SNTP).

Illuminator 111 (if connected to an AC power supply) can be kept synchronized with correct time by counting cycles in the supply current. Because the frequency of the AC power line is typically very accurately controlled, it can be used to maintain an accurate time once the time has been initialized.

When not connected to an AC power supply, or if an AC power supply is interrupted, illuminator 111 can maintain an internal time reference using a crystal oscillator connected to control microprocessor 401, or other accurate timing reference, perhaps integrated to control microprocessor 401. In such circumstances, controller 301 would typically be powered by a backup power source such as a capacitor or backup battery. Controller 301 would typically set itself to operate with reduced power consumption (e.g., by enabling a low-power operating mode of control microprocessor 401), as many controller functions would not be meaningful if there is no power available for the rest of the device.

Less accurate time can be maintained by using the internal clock of control microprocessor 401. The actual frequency of the internal clock can be estimated by applying a temperature-based correction calculation based on a temperature determined by temperature sensor 451 or by the forward voltage drop of one of LEDs 701. If an ultra-low power microcontroller is used, the internal oscillator or an external crystal can be operated for a long period from the charge in a capacitor, which can be replenished when external power (e.g., the AC line) next becomes available (e.g., after a failure and restoration of utility power). Often, the less accurate time determined by the internal oscillator is sufficiently accurate for lighting control purposes, particularly because it can be adjusted to a more correct through interaction with a director or another illuminator.

Time-based behaviors will often differ based on the day of the week and holidays or other special occasions. Configurator 151 can be used to define such patterns and times, and to communicate them to a director for delivery to illuminators 111

3.4 Control-Based Learning

Illuminator 111 can record the requests it has been given and repeat them at a later time, for example allowing it to learn desired on/off times on one day and repeating them on subsequent days.

Such learning could, for example, be adjusted by knowledge of specific days, weekends, and holidays, allowing repetition of desired behavior on appropriate days, for example mimicking a week's use of lighting.

Illuminator 111 could learn multiple distinct patterns of use, which could then be selected with director 111, allowing for example easy designation of "holiday" usage patterns by a human operator without the necessity of keeping track of specific holidays internally.

Such learning could, for example, be adjusted to accommodate temporary changes. For example, illuminator 111 could learn an average pattern of behavior by combining and averaging requests received over multiple days, so that temporary adjustments would not immediately change the learned average pattern on subsequent days. Director 121 could be equipped with an interface to designate any particular change as "permanent" (i.e., to be incorporated in the learned pattern of behavior) or "temporary" (i.e., to leave the learned behavior pattern unchanged).

Such learning could, for example, be configured to make small random adjustments to the pattern of usage and thus to provide a more realistic appearance of occupancy.

Such learned behavior could, for example, be coordinated across groups of illuminators, so that all the control changes for a group take place simultaneously, as they would for an explicitly requested change.

3.5 Ambient Illumination Response

Illuminator 111 can incorporate light sensor 431 to measure the light reflected from the field illuminated by illuminator 111. By sampling the light intensity returned under different conditions of illumination, the illuminator can determine how much light is being provided by other sources. For example, illuminator 111 can, for a brief period (e.g., milliseconds) reduce its brightness by a known amount or shut off entirely and measure the reflected light during that interval. Because the interval is so short, the change would not be perceptible to human observers.

Ambient light measurement allows illuminator 111 to reduce or eliminate its own output (thus reducing energy consumption) whenever sufficient other light (e.g., daylight, sunlight) is present to provide the desired level of illumination. The desired level could, for example, be set explicitly using director 121, or can be learned by manually setting the brightness to an acceptable level and then indicating that as the desired target level using director 121.

Ambient light measurement and response can be coordinated across a group of illuminators 111 to ensure that each one's field is sufficiently illuminated, even though that may require different brightness levels from individual illuminators.

The measurements can be coordinated through use of a synchronization protocol so that other illuminators are dark while each one measures its own contribution. Coordination of such measurements can be achieved through communication interface 501, by establishing specific windows during which measurements are made. Such measurement windows would need to be closely synchronized, which can be accomplished with a dynamically converging interaction process.

Ambient light adjustment is useful both on long and short time scales. For example, a long time scale could compensate for sunlight changes during the course of an entire day. A shorter time scale could compensate for sunlight changes caused by cloud movements or even by passing aircraft. For such shorter time scales, it is particularly useful to be able to make individual light intensity measurements rapidly, and to adjust individual illuminators independently, which motivates the use of a separate light sensor 431 in each illuminator 111, rather than for the system as a whole as is conventionally done with sun sensors. Another motivation for individual sensors is that the relative amounts of sunlight in different parts of a space will differ with the angle and position of the sun. Thus, some locations may require more added light because the sun is blocked by another building.

3.6 Occupancy Response

Illuminator 111 can incorporate sensors to detect presence of human occupants, enabling it to reduce energy consumption by providing light only when needed. If the sensor(s) detect(s) no indication of occupancy for an extended period, the light output can be turned off or decreased in brightness. Light output can be decreased gradually to minimize disturbance.

For example, motion sensor 461 can be a conventional long-wave infrared motion sensor can be used for detecting motion of warm bodies. Control microprocessor 401 can monitor and integrate the output of motion sensor 461 over a relatively long period to avoid accidentally turning off lights while someone is present.

Sound sensor 451 (e.g., a microphone) can also be used for occupancy detection. Control microprocessor 401 can perform signal processing to allow illuminator 111 to ignore repetitive or constant sound (e.g., fans, machines) and to give preference to less regular sounds, such as human conversation, as an indicator of occupancy. In an environment where multiple illuminators 111 equipped with sound sensors 451, the inputs from the different sensors can be analyzed together, as coordinated through communication interfaces 501, to provide more accurate recognition of occupant-generated sounds even in the presence of other sounds.

Motion sensor 461 can also be a video image sensor. Control microprocessor 401 can monitor the video image for movement and make decisions about probable occupancy based on the amount of change in the scene being viewed. A fisheye lens can be used to provide a full 180 degree field of view for such a sensor, since the fidelity of the image to a human-familiar viewpoint is of secondary importance to simple detection of motion and/or patterns.

One illuminator 111, or group of illuminators 111, incorporating such video image sensors can be configured to ignore movement in some areas of the image, so as to prevent detection of occupancy based, for example, on motion visible through an exterior window. Such configuration can be established interactively, for example using a handheld director 121 to indicate that location where the director is currently being used should not be considered in occupancy detection. A human operator could, for example, stand in front of a window and move director 121 around to indicate that the window is an area not to be considered.

A video image motion sensor 461 can be used to provide more precise recognition of motion and appropriate responses. For example, rather than needing to conclude that a room is unoccupied based on a lack of signals from a simple long-wave infrared motion sensor, a video image sensor can be used to recognize when a human leaves a room. Although the general problem of understanding occupant motion is an open research topic in computer vision, particularly when multiple people may be involved, it is much simpler to recognize an image of a single person exiting from a single-occupancy space such as a closet or bathroom.

A video image motion detector sensor 461 can be used to recognize natural gestures that affect lighting behavior parameters. For example, a repeated upward hand motion can be recognized and interpreted to mean that more light is desired, particularly if it is recognized shortly after an illuminator has decreased available lighting.

Typically, if multiple sensors are present (e.g., sound sensor 451 and motion sensor 461), illuminator 111 would combine signals and signal-derived conclusions from the different sensors to provide a more reliable overall detection of occupancy.

Illuminator 111 can, for example, make a perceptible signal, such as a brief blink or dimming of the light, and/or an audible sound and/or a synthesized voice, prior to turning off light output. Such a signal enables room occupants to respond in a way that indicates a desire for continued illumination. Illuminator 111 can also increase the sensitivity of its detection algorithms following such a signal, so that even a slight subconscious reaction from an occupant could be detected. Thus, even when a single person is alert but essentially motionless in the illuminated space, a low-level signal and slight reaction can be sufficient to maintain illumination. The intensity of the signal and sensitivity of the detection can be increased several times before turning off the light.

Perceptible responses from illuminator 111 may be employed in a variety of other circumstances, such as responding to voice commands or configuration instructions. Synthesized voice response in particular can contribute significantly to ease-of-use when configuring and adjusting illuminators.

Rather than a discrete signal to indicate impending darkness, the light can be gradually dimmed as the sensors continue not to indicate occupancy, and then brightened as occupancy is detected. This behavior can be configured to be subtle and below the normal threshold of perception.

Multiple illuminators 111 in a single space can coordinate their occupancy detection responses and achieve more accurate results than would be possible with the single sensor that is often used in traditional implementations. For example, occupancy detected by any of the illuminators in a conference room could result in maintaining illumination throughout the room. Because the motion sensors 461 "see" essentially the same field that the LEDs illuminate, such coordination ensures that any occupant who can see with the light can also be seen.

3.7 Building System Integration

The distributed nature of controllers 301 and associated sensors in an ICN installation can improve operation of other building systems by providing inputs that are more accurate, more responsive, and/or finer-grained than those provided by the native sensors and inputs in such systems.

For example, the occupancy detection mechanisms discussed above can be integrated with other building systems, for example providing input to controls for heaving, ventilation, and air conditioning (HVAC) systems. In such applications, when the ICN system determines that a space is unoccupied, it can so advise the building HVAC system (e.g., through its communication interface 501 and a gateway 161 that is connected to the building management system), which can respond by adjusting temperature and related set-points. The distributed nature of the ICN sensors across multiple illuminators 111 can make it possible for the ICN devices to reach a more accurate conclusion about occupancy than is possible for the smaller number of sensors typically employed in a typical occupancy-responsive HVAC system.

As another example, other building systems can be integrated with ICN occupancy detection, such as those that control automated blinds or window covers, those that enable building security controls, etc.

Depending on the nature of the building control systems, an ICN installation can be integrated so that it directly specifies the desired results (e.g., by directly adjusting a thermostat through an electrical remote control input) or so that it simply provides advisory input to the building system(s), for example by a network connection (implemented with a gateway 161 component) to a building control system.

Integration can take place at less sophisticated levels, as well. For example, a very simple integration would be for illuminator 111 to provide direct control inputs to other devices, such as controlling lights that are not otherwise part of the ICN system but that mirror the status of that illuminator (or a set of illuminators). Such integration can, for example, be implemented through traditional control systems such as X10, where controller 301 produces such control signals as output. Such integration can also be implemented as direct electrical outputs from a controller, or at a higher level of abstraction through more sophisticated network protocols invoked through an ICN network and/or a gateway component.

3.8 Voice Response

Illuminator 301 can incorporate sound sensor 451 (e.g., a microphone) and voice recognition software in control microprocessor 401 to allow it to respond to voice requests. Limited-vocabulary voice recognition software is widely available commercially, and is used in applications such as interactive toys and hands-free telephones.

A "trigger phrase" can be used to reduce the likelihood of spontaneous and unintended recognition.

Response to voice requests can be coordinated across groups of illuminators 111 just as are other types of control requests.

Voice recognition can be coordinated across plural illuminators 111 to ensure more accurate results, for example by selecting the several illuminators exhibiting the highest confidence recognitions for a particular request, and ensuring that all those are in fact recognizing the same request. In such a embodiment, each illuminator that recognizes a voice request could broadcast a message to other neighboring illuminators requesting that they respond with an indication of whether they recognized the same voice request. Using conventional distributed computing techniques, the illuminators can coordinate their joint knowledge of voice requests and reach consensus on what, if any, action should be taken.

Sounds other than voice can also be recognized. For example, to assist people with hearing disabilities, illuminator 111 could be configured to translate ambient sounds such as telephone rings or smoke alarms to modulations of light intensity or color. Such capabilities are conventionally provided by auxiliary devices, but could be integrated into an ICN installation simply through installation of additional behavior software modules 801.

3.9 Redundancy and Failure Response

Output reduction due to aging as well as outright component failure are significant issues for LEDs.

To ensure a long effective lifetime for illuminator 111, additional LEDs 701 can be incorporated along with software in control microprocessor 401 that allows constant output to be maintained even as aging or failures occur.

Control microprocessor 401 can adjust drive current provided by power supply 741 as the LEDs age to increase light output. Additionally, if LEDs 701 are not operated at 100% duty cycle at the beginning of the illuminator's life, controller 301 can increase the pulse width modulation duty cycle to increase effective output.

Additionally, control microprocessor 401 can enable use of redundant (spare) LEDs that were not used at all initially. Enabling spare LEDs allows the illuminator both to maintain output over time (by adding additional LEDs and, as needed, reducing the drive current and/or modulation) and to tolerate LED failures by simply switching in a replacement LED.

The output of LEDs 701 can be measured directly, by a light sensor 431 coupled to a particular LED or LEDs to determine the need to increase output. Additionally, light output can be measured indirectly, by observing the differences in ambient light produced at different levels of (including zero) of drive current. Light output can also be modeled based on the LED manufacturer's specified aging properties.

Measuring LED output by examining the effect on ambient light intensity (e.g., from a light sensor 431 not coupled to LED(s) in the illuminator) will typically depend on the reflectivity of the objects and surfaces illuminated by the LED. Because that reflectivity may change over time (e.g., objects may be moved, surfaces may be covered), such measurements may require careful long-term monitoring of changes in the environment and recalibration of the factors used to estimate LED brightness from the measured light intensity at light sensor 431. Because LEDs typically age in a relatively slow and predictable manner, even though the light-to-age relationship for any particular LED may differ from others, it will generally be practical to distinguish between the rapid changes in reflectivity caused by human activity and the slow changes in brightness caused by aging.

Aging also potentially affects color spectrum. Control microprocessor 401 can compensate for this effect based either on color-sensitive sensor inputs or a model of aging-related color performance.

When controlling a non-LED light source, it may be impractical to monitor individual light sources (e.g., light bulbs), or to bring in replacement sources automatically. However, even in such applications, controller 301 can monitor power consumption to detect when one of the several bulbs in a device has failed, and in some cases (e.g., fluorescent bulbs) may be able to detect power consumption patterns (e.g., slow start) that indicate a failure will occur soon. In such cases, controller 301 may choose to reduce the maximum permitted brightness to increase the likely lifetime of remaining bulbs (at least until replacement).

Information about failures and potential failures can be used in a variety of ways, depending on the configured behaviors. Information about aging or failure can be used to alter operation of illuminator 111 where the information is obtained, for instance by changing brightness levels or enabling redundant light sources. Additionally, such information can be used to drive requests to neighboring illuminators to compensate for changes in one illuminator. Also, it can be delivered as a status report, for example on demand to a human operator or automatically to a building management system.

3.10 Temperature-Based Feedback

As junction temperature increases, an LED light output typically decreases, and its emitted spectrum shifts.

Control microprocessor 401 can compensate for changes in light output by measuring junction temperature and adjusting drive current and/or modulation.

Control microprocessor 401 can compensate for changes in color spectrum by measuring junction temperature and adjusting the drive current and/or modulation for other LEDs 701 (which have different output spectra) in the illuminator that influence the overall blended color.

Junction temperature can be measured indirectly by measuring the forward voltage drop of LED 701, using analog-to-digital converter 421. Because of basic semiconductor physics, junction temperature varies predictably with temperature. However, because forward voltage drop also is affected by random variations in manufacturing, it may be necessary to measure the forward voltage drop at one or two reference temperatures prior or during manufacture of illuminator 111, but once those parameters are stored by control microprocessor 401, it can use them to calculate junction temperature while the illuminator is operating.

Junction temperature can also be measured directly by a temperature sensor 451 (e.g., a semiconductor temperature sensor of thermocouple). However, it can be difficult to get an accurate measurement for the junction itself, because it may be infeasible to place temperature sensor 451 in sufficiently close proximity to the junction of LED 701 to get an accurate reading of temperature.

In addition, measurement of ambient temperature can be incorporated into the integration of ICN controllers 301 with other building control systems, such as HVAC, to provide a more accurate picture of temperature distributions in a building than may be readily available to the HVAC system itself.

3.11 Status Reporting

Illuminator 111 can measure and/or calculate a variety of characteristics about its operation including effects of LED aging and compensatory action, actual power consumption, ambient illumination and apparent light output, total operating hours, LED temperature, AC line power quality, etc. Such status information can be accumulated by control microprocessor 401 and reported back to configurator 141 or other destination through director 121 or gateway 161. Such status information can also be communicated directly to a director 121.

One application of such reporting is to allow failures to be tracked and predicted, so that maintenance can be conveniently scheduled, and also to monitor correct operation of the illuminator.

To identify a particular illuminator 111 for purposes of interpreting reported status information, each illuminator can be assigned an identifier at the time it is installed; additionally, this identifier can be subsequently updated. An illuminator 111 may have multiple identifiers used for different purposes, such as one that identifies physical location and one that associates it with an activity performed in an area. Identifiers can have multiple parts, such as identifying a building, a floor within the building, a room location, and an identifier for different illuminators 111 within that room. Multi-part identifiers can be used to define group membership.

Identifiers can be assigned manually, for example by entering a numeric value on the keypad of a director and instructing a particular illuminator to adopt that identifier. Alternatively, identifiers can be assigned semi-automatically, by instructing them in turn with a director that assigns sequential identifiers. Identifiers can be assigned automatically by allowing the illuminators 111 in an area to interact such that each illuminator is assigned a different identifier. Automatic assignment can take place implicitly as a side-effect of the installation process, or when instructed by director 121. In the case of multi-part identifiers, director 121 can be used to assign explicitly that part of the identifier that is common to all illuminators in an area by instructing a single illuminator to establish that common part, and another technique can be used to assign the other part of the identifiers.

Director 121 can be used to interrogate an illuminator for its identifier, allowing, for example, automatically assigned identifiers to be obtained and recorded on a map or floorplan.

3.12 Location Identification

For status reporting, it is often helpful to know the physical location of each illuminator 111, so that an illuminator requiring maintenance can be easily found in the physical world.

One approach to identifying locations is to place them explicitly on a map by interaction with director 121. A human traveling through an illuminated space can interrogate each illuminator 111 in turn with a director 121 that can record the illuminator's physical location in an internal database. Physical location can be determined by a director that is equipped with or connected to a Global Positioning System (GPS) device and/or other location-determination technology (e.g., an indoor location system based on broadcast television signals, wireless hotspot signals, or even an inertial-assisted GPS location technology). Alternatively, physical location can be explicitly recorded against a map or other representation of the space displayed by director 121. In such manual detection modes, each illuminator 111 can remember whether its position has been recorded and make that information globally available, allowing the human operator to be reminded if there are any remaining positions to record before leaving the area.

Alternatively, the illuminators 111 can incorporate measurement technology allowing them to determine their own locations. An ultrasonic transducer, which may also be used as communication interface 501 to carry the communication protocol, can measure relative distances between illuminators. Distance measurement by ultrasound is relatively easy, since the speed of sound allows high-precision measurement of distance with simple hardware. Distance measurement can also be performed by measuring delays or phase shifts in an infrared transmission, but more sophisticated techniques are required because the delays are so much shorter. Because many of the inter-illuminator paths for ultrasonic and infrared communication will involve reflection, geometric analysis may be required across all the measurements in an area to translate the measured path delays into actual physical locations. However, because illuminators rarely move (particularly when permanently installed), measurements may be taken over a long period and analyzed with digital signal processing techniques to obtain additional information.

When location identification is performed, each illuminator 111 can also be informed of its position, and provide its location rather than just its identifier, when reporting status information.

3.13 Location-Adaptive Control

In combination with location identification and awareness, a set of illuminators 111 can cooperate to provide a balanced adjustment of light intensities and colors in response to a request directed at a single illuminator. Similarly, autonomous control behaviors may, through communication among illuminators, provide a lighting experience more closely adapted to human needs.

For example, when a single worker in a large office space requests more light or a change in the light's coloration, by directing that request to a single overhead illuminator 111, if only that illuminator responds, it will be a clearly visible non-uniformity in the overall pattern of light delivered to the large space. If many workers make such adjustments, the overall lighting pattern can become very ragged and aesthetically unappealing. By using the knowledge of illuminator location, the illuminator receiving the request can also ensure that other nearby illuminators participate in the requested change but to a lesser degree, so that the overall pattern of light is maintained in a more uniform, smoothly varying fashion. Using conventional distributed processing techniques and knowledge of illuminator location, illuminators can construct a map of the light intensities of all the illuminators in a neighborhood, and adjust their brightness levels to ensure a smooth lighting gradient.

As another example, if a person is walking through a corridor in a darkened area, illuminators 111 that detect the pattern of progress (through their motion sensors 461) can arrange for illumination in other areas, in advance of the person's anticipated arrival. This can be particularly advantageous for outdoor lighting, where it is desirable to light an entire pathway when a person is going to travel along the path.

3.14 Adjustable and Learned Response

Parameters governing behavior response may be selected from a set of template behaviors, or may be explicitly programmed, through the interface provided by configurator 141 and director 121. For example, in an occupancy response behavior, parameters could govern the length of time required without an indication of occupancy after which an illuminator 111 would conclude that there are no humans present. Similarly, parameters could govern the amount and/or type of signal required from motion detection sensor 461 used for occupancy detection that should considered as a positive indication of occupancy.

In addition, director 121, voice command, or other means may be used to request adjustment of the behavior parameters. For example a human could request explicitly that the timeout period and/or detection thresholds be increased/decreased without explicitly specifying actual parameter values. Also, the system can learn from human responses to adjust the detection parameters, for example increasing the timeout if it detects an immediate and/or particularly vigorous human response upon decreasing the illumination. Such autonomous adjustment behaviors can in turn be selected from a set of behavior templates and specified for system elements without explicitly specifying parameter values.

3.15 Alarm and Security Functions

Sensors in illuminator 111 can act as part of an alarm or building management system. When an illuminator recognizes an unusual condition such as detected motion during times when the space is expected to be unoccupied, or high or low temperatures possibly indicating an HVAC failure or fire, or power failure conditions, information about that condition can be delivered to an alarm or building management system, as well as triggering behaviors for that or other illuminators 111.

For example, detection of motion at inappropriate times could cause all illuminators 111 in an area to illuminate, as well as triggering an alarm for the building management system. Similarly, an out-of-range temperature could cause illuminators to blink in order to attract human attention.

Another security-related function is the ability to identify and locate where people are present in a building through use of the same sensors used or occupancy detection. In an emergency situation, this information could be used to assist emergency response personnel in locating persons.

Another security-related function is the ability to monitor the ambient sound or video environment using sound or image sensors and transmit sound or images back to a monitoring system in the event that a potential intrusion is detected.

Alarm and security indications based on such sensors would typically employ different thresholds and parameters for detecting intrusions (i.e., occupancy when none is expected) than when detecting occupancy primarily for control of illumination.

Another example of integration with security functions would be to use the occupancy-detection information obtained from the ICN system to trigger changes in the security state for a building. For example, the doors into an area could be automatically locked when there are no occupants, but kept unlocked whenever people are present. Such behavior could be occur, for example, only during specifically configured time periods.

3.16 Battery Management

In some applications (e.g., solar-powered illuminators, emergency lighting), illuminator 111 may incorporate a battery power supply.

In an emergency lighting application, illuminators 111 used for general application can also be used to provide emergency lighting under battery power. In such applications, only a subset of illuminator 111 may be connected to batteries, and the light that they provide when line power is unavailable may be optimized for power efficiency rather than brightness, color balance, or other characteristics.

The battery management behavior can make adjustments to use the battery's available lifetime most efficiently, for example by reducing brightness (and thus power consumption) as available battery power decreases. This changes can be time-driven (and associated with the solar illumination cycle anticipated for the time of year), so that, for example, battery power is consumed at a rate that ensures some light is available for the entire period when the sun is not present, even if (for example) the previous day's inclement weather only allowed a partial battery charge.

Illuminator 111 can provide status information about the current state of the battery and its charge (for instance, by reporting voltage and/or current flow into the battery). It can also conduct controlled-discharge tests to measure the current quality of the battery, in order to predict when a battery is reaching the end of its lifetime and will need replacement.

Battery status can be reported as part of status reporting; it can also be indicated directly by the illuminator. For example, in an emergency lighting application, an illuminator can introduce a small periodic modulation of light intensity that is clearly visible to a person but that does not significantly interfere with providing light. Alternatively, light intensity can be decreased as battery capacity nears exhaustion, to maximize availability of light.

It will be evident that not all illuminator 111 in an installation would necessarily require battery backup, as satisfactory emergency lighting may only require that a limited subset of illuminators be involved. Additionally, it will also be evident that multiple illuminators can share a single battery, with the individual controllers determining autonomously which one(s) is/are responsible for managing the charging of the battery.

3.17 Leasing Control

It is possible to utilize the software-based controls executed in control microprocessor 401 to allow some parties to control or limit the usage of functions of illuminator 111 by other parties.

For example, in a building containing a lighting system controlled by an ICN system, the building's owner(s) and/or tenant(s) may lease the lighting system from another party, the lighting system lessor. The lessor can maintain logical possession of the lighting system by exercising control over the software that runs in illuminators 111 components so that some or all illuminator functions become inoperable or limited if some such software or control parameter data is not updated on a regular basis by the lessor. Removing or limiting availability of control functions would allow the lessor to virtually repossess the leased lighting system in the event of lease non-payment. Similarly, such leasing controls could be applied by a building owner to multiple individual tenants within the building.

As another example, because the capital cost of some advanced lighting technologies (e.g., LEDs) is relatively high compared to the cost incumbent technologies (e.g., fluorescent lamps), the ability to lease lighting equipment can provide a valuable economic benefit to the lessee. The ability for the lessor to retain effective control of the equipment through the software control mechanisms described herein allows the lessor to engage in such transactions with an acceptably low level of risk. In such a case, the lessee can substitute an operating cost for a higher initial cost, and the lessor can finance the equipment attractively because the risk of loss is countered by the control mechanisms.

As another example, the owner or supplier of ICN-based systems could selectively supply control behaviors to customers on an individually purchased (or otherwise controlled) basis. This capability would enable a variety of business models beyond simple purchase; for example, a supplier could allow a building operator to have a six-month trial of some function (such as occupancy-sensing behavior) such that the operator could then decide (e.g., based on the cost savings experienced) whether or not to purchase that capability on a permanent basis.

As another example, the mechanism of controls and reporting described here could be used to report energy consumption and to calculate energy savings, enabling multiple parties to share benefit from the reduction in actual energy costs. Because it can be collected and reported securely, that data could, for example, be used as a basis for rebates from an energy supplier.

As another example, the approach of allowing an external party to adjust control network behavior can be applied to allow an energy supplier (e.g., public utility) to send remand-side load management requests to the network, requesting that the energy consumption of some or all the controlled devices be reduced or eliminated. A utility, for example, could request that lighting levels be reduced by 25% (which for LED lighting with current control would typically result in a greater than 25% energy savings) during some period of time, and provide a preferential rate for power during that time period.

It will be evident that although the ICN architecture provides a preferred embodiment of the concepts described herein, the enforcement of business rules such as property leases can be implemented in many other types of control system.

The duration of a lease could be expressed in terms of, for example, calendar time, operating hours, and/or energy consumption. For example, a lessor might specify that lease payments are due on a monthly basis, or for every 1000 kilowatt-hours consumed by the entire lighting system, or for every 1000 operating hours accumulated for each fixture. Using the ICN capability for grouping and/or location identification, lease duration could be specified in terms of rooms, floors, areas, and/or other groupings.

The lease could be implemented by running a lease control behavior module 801 in controllers 301 that would measure the elapsed time, operating hours, energy consumption, and/or other lease control parameter. When the lease parameters were reached or exceeded, the lease control module could respond by disabling the controlled device entirely or by selectively limiting the control behaviors that it can exhibit.

As long as the lessee is in good standing, the lessor would supply, on a periodic basis, new lease control behavior modules 801 and/or lease parameter data for such modules, so that no functional limitations would be experienced.

In addition, a lease control module could implement multiple limits, so that different limitations apply depending on how far the lease parameters had been exceeded. For example, a lease could specify that controlled lighting would operate at only 50% brightness in the first month that the lease parameters are not met, and reduce further to 25% in the second month, and to flicker or blink annoyingly after the third such month. Alternatively, desirable behaviors could be disabled when the lease terms are not met, such as disabling occupancy sensing and leaving lights on at all times—thus increasing the lessee's energy costs.

Sub-leasing and delegated control can be implemented in such a framework. A building owner and/or property manager could specify different terms for different groups of controllers 301, allowing lease terms for individual tenants in a building to be specified and enforced independently. Multiple levels of lease terms could apply concurrently; for example, the system supplier might have a set of terms that apply to an entire building, in the case that the property manager is the actual lessee for the system, and the property manager could in turn sub-lease use of the ICN system to individual tenants.

In a delegated situation (e.g., a building owner that sub-leases the ICN-controlled functions to multiple tenants), a lessee's minimum usage rights could be guaranteed by the lighting system supplier. A tenant could use configurator 141 or director 121 to obtain accurate information about the limits applied by each level of lessor.

Lease behavior modules and/or parameters can be delivered over the Internet or other networks, either on a demand ("pull") or delivery ("push") basis. Delivery can be made through a gateway 161 component, configurator 141 and/or director 121 components, or any appropriate combination. Delivery can be periodic and automatic, ensuring, for example, that a lessee in good standing does not experience unwarranted service interruptions. In the event that some failure or unexpected circumstance makes a delivery mechanism inoperable, the ICN software (e.g., in controllers, directors, and/or configurators) can give the system user an indication that the expected delivery has not occurred and may result in a service interruption if the fault is not remedied.

4 Communication

Every controlled appliance 101 (e.g., illuminator 111, controlled power source 102; that is, any element that incorporates controller 301), as well as every director 121, gateway 161, and combined configurator/director 151 incorporates at least one communication interface 501. Typically, communication interface 501 is bi-directional and can both send and receive messages (not necessarily simultaneously); however, in some cases (e.g., fixed function director 122), only a one-way interface is required.

Controllers 301 and directors 121 communicate with each other to receive and acknowledge requests, to deliver reports, and to forward requests throughout a constellation of controlled appliances 101. Controllers 301 communicate with each other to forward and deliver messages of all types and to ensure, through use of acknowledgments, that messages are delivered to all controllers that are intended to receive them.

Communication can be viewed as three logical layers: the physical layer used to transmit bits from one component to another; the network layer used to manage communication among the components; and the application layer, used to coordinate the activities of multiple components.

The physical layer is implemented in part by communication interface 501, which is a hardware component that sends and receives data. Software running in control microprocessor 401 may implement part of the physical communication layer as well, performing modulation and demodulation to transform between raw electromagnetic signals used by communication interface 501 and digital data comprising messages. Common physical communication techniques are infrared and ultrasound, although radio, hardwired, power line modulation, and/or other techniques can also be used if appropriate.

The network layer provides for transport of data between senders and recipients, and also may provide either a direct or emulated multicast capability. In the ICN architecture, the data transfers are almost always short, so communication can be optimized for such traffic.

The application layer manages message exchanges between software modules 801 running in different controllers 301, enabling them to coordinate their activities and providing a reliable transmission service to store and forward messages.

Gateway 161 elements can be used to integrate the ICN communication mechanisms with other networks, allowing information (such as requests and reports) to be delivered over the Internet and/or private networks. Conventional network security mechanisms (e.g., authentication, encryption, firewalls) can be used to protect an ICN network from unauthorized use or access. An ICN network can also be used as transport for information from other networks, e.g., by mechanisms such as IP tunneling. Integration with the Internet and private IP networks allows ICN elements to be controlled and interrogated from arbitrary locations, facilitating remote control and building management.

4.1 Physical Layer

A variety of physical layer communication mechanisms may be used by controller 301. In some cases, it is advantageous to combine multiple communication interfaces 501 in a single controller 301.

Infrared has the advantage of being effective in approximately the same region that the light itself is present, giving it the intuitive property (for illuminator-type devices) that if two illuminators provide some illumination to the same area, they are also able to communicate. Another desirable characteristic of infrared (and one it shares with ultrasound) is directionality: it is easy to point a narrow-beam infrared director at a specific illuminator to deliver a request. Infrared is more than fast enough for ICN: it can easily run at 1 megabit/second.

Ultrasound has somewhat different propagation characteristics than infrared, although typically not enough to matter, and in some cases (e.g., through doorways and archways) may be desirably better. It has the advantage that it can easily be used for distance measurement and therefore location determination among a group of illuminators or other devices. Ultrasound is not particularly fast: several kilobits/second is probably a practical limit.

Radio is fast and can operate through building walls even at low power. This is not necessarily a desirable characteristic: in ICN applications such as lighting control, as often it is desirable for requests to be limited to a single room or part of a room. The ZigBee standard is becoming widely used for building controls, however, and integration with such systems is desirable. Such integration can be achieved through gateway components, or through controllers equipped with radio interfaces such as ZigBee in addition to other interfaces.

Power line modulation is an older, slower, and less reliable technology, and is typically one-way (for example, the X10 control interface). Supporting X10 appears straightforward as a software function, and could be useful in some environments, but it is not suitable as the general-purpose interface required by the ICN architecture. The newer Insteon powerline modulation interface is also feasible to implement.

Light output modulation is a possible interface. It has the advantage (over infrared) that its reach is completely evident and intuitively understandable. However, in the ICN application its use may be challenging if pulse-width modulation? brightness control is also used, as that will introduce considerable noise and a challenging modulation problem for physical communication layers relying on carrier sense multiple access (CSMA).

Wired control mechanisms, such as the DMX, DALI, and/or Echelon protocols, can also be used to deliver requests to controllers, but they are not suitable as the general-purpose ICN communication mechanism.

Additionally, voice response may be implemented as a software application in a controller. It could be used for delivering requests, which could typically be acknowledged by a quick blink or simply by the requested action having taken place.

4.2 Network Layer

The ICN network layer is typically a low-latency mesh network. Such a network can be adapted from widely-available technologies, such as the IEEE 802.11 infrared network standard and the ZigBee mesh networking architecture.

In some applications, it is desirable for the network layer to allow low-latency interactions between directors and controllers, so that human operators do not perceive any delays. For this reason, it may be advantageous to remove or limit some of the mechanisms defined for networking standards to optimize performance in the ICN system, where short messages are the norm and latency, not throughput, is often the primary consideration.

Several basic principles drive the design of the network layer:

- Every controller is treated as a node in a distributed mesh network
- Messages may be addressed to a specific node or to a logical group of nodes
- Messages are forwarded to by nodes to other nodes in a group
- Every message is acknowledged, and retransmitted if not.
- The network is optimized for rapid delivery of messages to such logical groups
- The network is optimized for delivery of relatively small, fixed-size messages; larger messages are constructed at the application layer.

4.3 Application Layer

A function of the application layer is to ensure reliable message delivery from an originating sender to one or more recipients and/or groups of recipients. Because not all system components may be operational (for example, some devices may not have power when the message is sent) when a message is entered into the system, other components would typically be able to store messages and queue them for later delivery.

A protocol such as the XNS Clearinghouse Protocol can be used to accomplish such delivery, particularly adapted for the network and group characteristics of the ICN system.

In large ICN systems, it is typically necessary for some components to act as gateways, using alternative communication interfaces to deliver messages over long distances or through barriers (such as walls) where the normal interface (e.g., infrared) cannot be used. The store-and-forward processing can take advantage of these gateways to ensure reliable delivery throughout the system.

5 Controller Software

Software running in control microprocessor 401 is responsible for implementing all the control, communication, monitoring, and behavior functions performed by controller 301. Because cost is typically an important consideration for the implementation technology of controller 301, the software is typically optimized to minimize resource requirements and runtime cost.

Activities typically occur within control microprocessor 401 on plural distinct timescales. In the example embodiment of illuminator 111, those timescales include high-rate, medium-rate, and low-rate activities.

Mid-rate activities are timer-driven and typically occur at 480 times/second (that is, within a "housekeeping interval" of just over 2 ms.). They activities include management of the high-resolution software clock, adjusting power control parameters, scheduling high-rate activities, and monitoring sensor inputs. The 480 per second rate is chosen to be easily synchronized with the AC power line and to be above the typical minimum threshold for LED pulse-width modulation timing to eliminate thermal stress from cycling LED power.

High-rate activities are both event-driven and timer-driven, and can occur at rates up to 25,000 times/second. High-rate activities include LED power control setting, IR transmitter bit generation, and IR receiver bit recognition. High-rate activities are very precisely timed within the housekeeping interval, using a high-resolution hardware timer running at the processor's clock frequency.

Low-rate activities occur at much lower time scales than the housekeeping interval: typically seconds or minutes. These include various types of status monitoring and communication.

Figure 8:
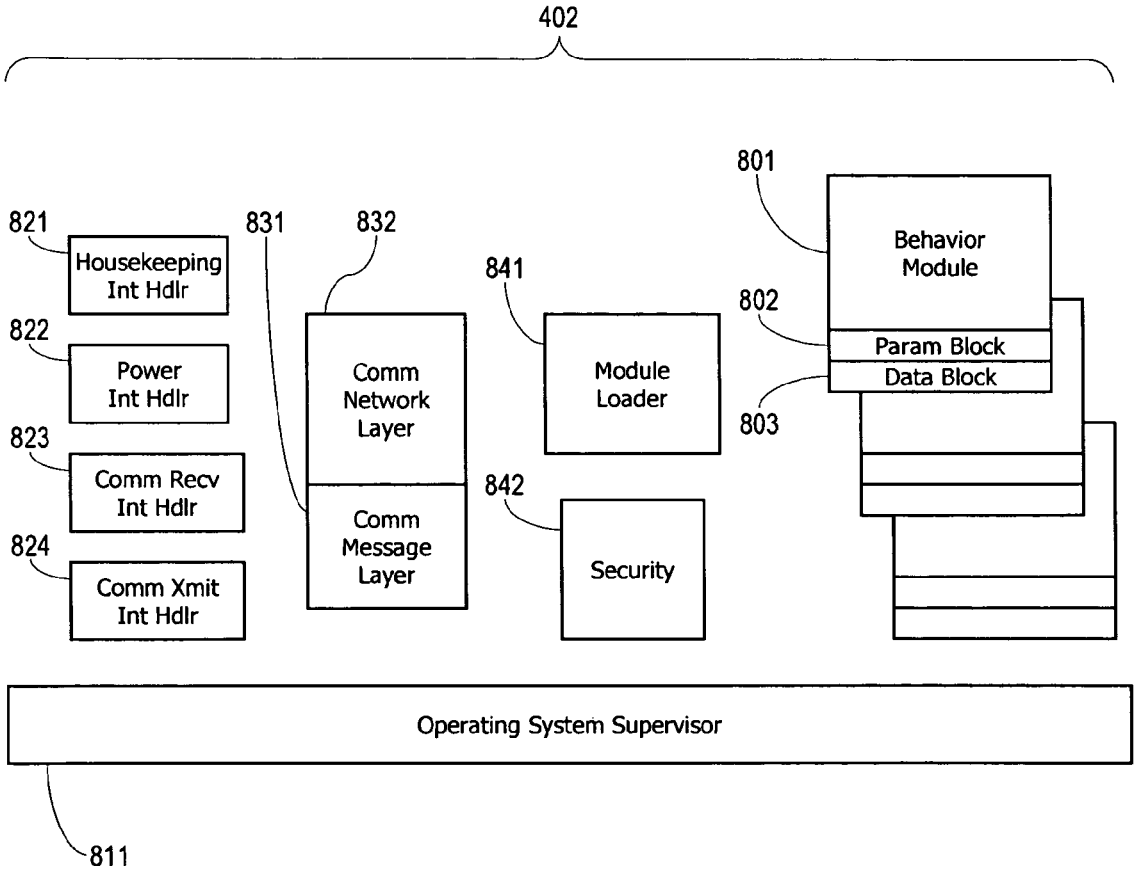
FIG. 8 shows the structure of software components in a typical controller implementation.

In the example embodiment of illuminator 111, control microprocessor 401 in controlled 301 would typically run control software 402 consisting of the following elements, as shown in FIG. 8:

Operating system supervisor 811
Housekeeping interrupt handler 821
Power control interrupt handler 822
Communication receive interrupt handler 823
Communication transmit interrupt handler 824
Communication message layer 831
Communication network layer 832
Module manager 841
Security library 842
Plural behavior modules 801
Plural external parameter blocks 802
Plural internal data blocks 803

Additional software components may be present in control software 402, depending on the specific functions to be performed by controller 301. As one example, additional hardware functional units or sensors may have specific interrupt handler components. As another example, a test/debug/configuration component may be present. As a third example, other communication interfaces 451 might require additional communication interrupt handlers 823 and 824 and/or communication components. Such components may be part of the basic control software 401 or may be dynamically installed and/or removed as behavior modules 801.

5.1 Summary of Control Software Components

Operating system supervisor 811 is a tiny real-time operating system kernel that supplies services for task dispatching, inter-task communication, and memory management.

Housekeeping interrupt handler 821 is a timer-driven interrupt-handling module that performs the mid-rate housekeeping tasks. It keeps track of real time and ensures that high-rate and low-rate activities are scheduled appropriately.

Power control interrupt handler 822 is a timer-driven high-rate interrupt handler that controls MOSFET switches 711 to control illumination of LEDs 701. It may implement a pulse-width modulation (PWM) or other modulation scheme to adjust brightness and color. To minimize interrupt cost, power control interrupt handler is driven by data in LED control table 2101.

Communication receive interrupt handler 823 processes interrupts from communication interface 751, which typically indicate receipt of one or more bits of a network message, and which are deposited into a message input buffer, but may also be noise that can be recognized and rejected by communication receive interrupt handler 823. Communication receive interrupt handler 823 is typically invoked only in response to external events and is not timer-driven.

Communication transmit interrupt handler 824 is a timer-driven module that controls the output (transmit) aspect of communication interface 751. It is driven by data read from outgoing message 2301.

Communication message layer 831 is responsible for formatting and addressing network messages, managing input and output buffers. It sets up the parameters and buffers that drive communication interrupt handlers 823 and 824, and performs other typical tasks associated with the Open Systems Interconnection (OSI) layered network model.

Communication network layer 832 is responsible for managing application communication in the overall network of controllers 301, ensuring that messages are delivered to required recipients, processing acknowledgments, and performing other typical communication tasks associated with the Network and Session layers of the OSI network model, managing input and output buffers. It sets up the parameters and buffers that drive communication interrupt handlers 823 and 824.

Module manager 841 loads and unloads behavior modules 801 and associated data blocks 802 and 803. It is responsible for validating modules, managing memory, maintaining associations between modules and data blocks, associating modules with network message types delivered by network layer 832, managing dependencies among modules, assembling modules from fragments during module download and delivery, and other tasks associated with behavior modules 801. Module manager 841 is also responsible for managing dynamic updates to other software components of control software 402, and for updating and accessing external parameter data blocks 802 and internal data blocks 803.

Security library 842 provides cryptographic functions for authentication, encryption, decryption, key management, and other purposes. Cryptographic functions can used by module manager 841 to validate modules, by communication message layer 831 or network layer 832 to protect network messages, and/or for any purpose required in some behavior module(s) 801.

Behavior module(s) 801 are executable modules that can be loaded in arbitrary combinations into control microprocessor 402. They can implement above-described behaviors and/or arbitrary other functions. A behavior module 801 typically has an associated external parameter data block 802 that specifies parameters to control the behavior, and may also have an associated internal data block 803 that maintains, internally to control microprocessor 401, non-volatile storage for information relevant to that behavior module 801. Behavior modules 801 can have metadata that identifies dependencies and allows for version management.

Some components of control software 402 and of typical behavior modules 801 are described further below as examples of how implementation requirements may be satisfied. It will be evident to one skilled in the art that these are only examples, and that the functions described in this section and in section 3, Illuminator Behaviors, can be implemented in a variety of ways using different approaches, using well-known algorithms for distributed computing.

For example, to implement any particular distributed behavior, the illuminators can agree on ("elect") a single master illuminator, which then becomes responsible for polling and/or receiving announcements of requests and state changes. The master illuminator in such an embodiment maintains state associated with all the illuminators involved in the distributed behavior, and issues appropriate requests to relevant illuminators to achieve the intended results. Such a single-master approach is often simpler to implement than a true distributed algorithm, but requires successful execution of an election algorithm, and also requires a technique for recovering if the master illuminator becomes inoperable.

As another example, illuminators can use broadcast messaging to keep each other informed about state changes, such that all illuminators in a group can maintain accurate, or nearly-accurate, representations of global state, and adjust their own state accordingly. Such an approach is most appropriate for behaviors involving stimuli that may be detected by an arbitrary single illuminator (e.g., voice recognition, occupancy response, alarm response), yet must be acted upon by many illuminators.

It will be evident that components of control software 402, in particular behavior modules 801, can be implemented as code that is directly by control microprocessor 401 and/or, optionally, as interpreted code that is interpreted by a virtual machine or interpreter such as Java, Forth, or other interpreted or threaded execution technique. Such alternative execution techniques have the potential to reduce code size, minimize risk of code implementation errors, and/or simplify the code development process. Such alternative execution techniques may require additional software components in control microprocessor 401 to implement the interpreter and/or virtual machine.

5.2 Control Microprocessor Functions

Figure 9:
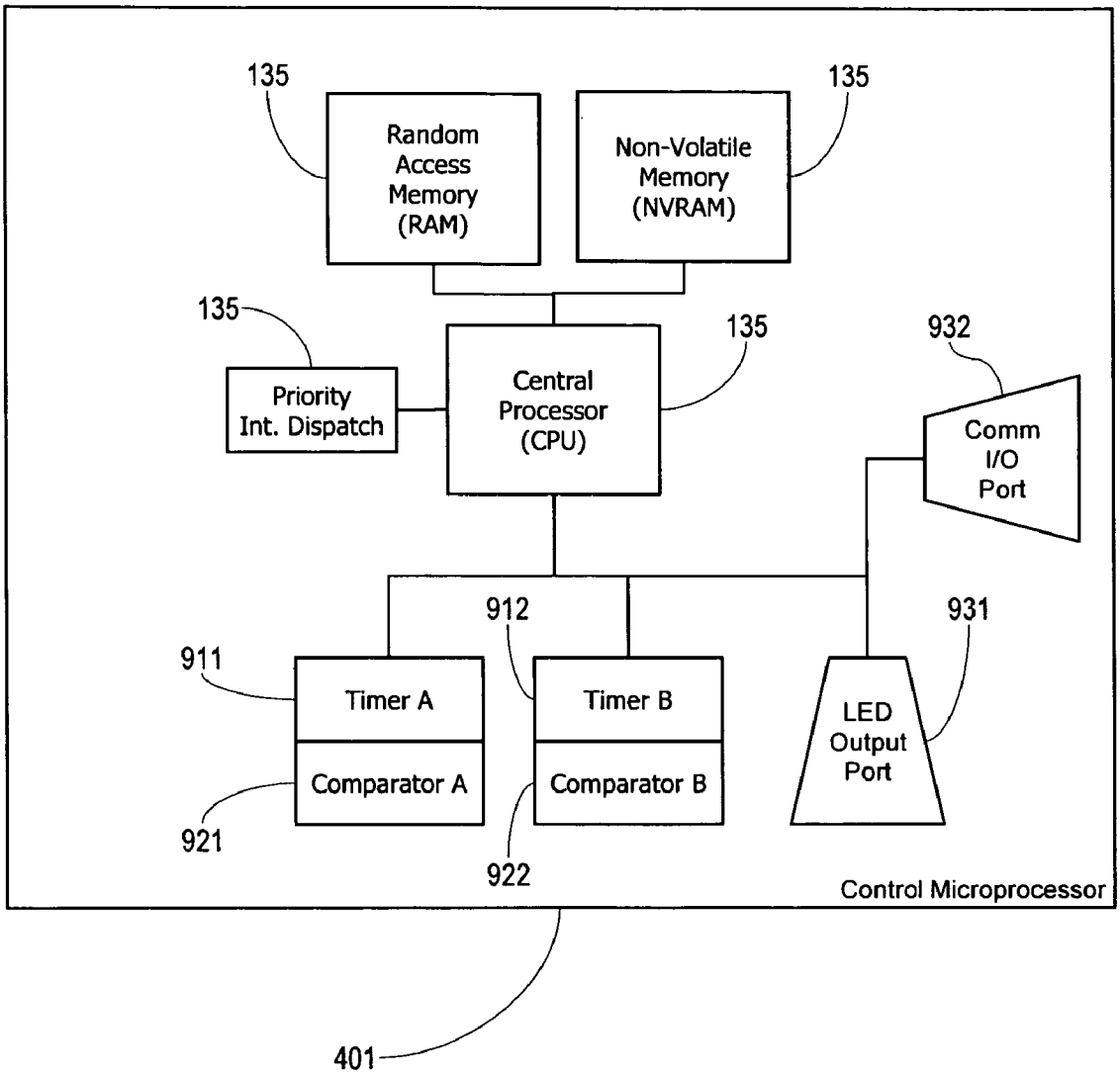
FIG. 9 shows the internal components of a typical control microprocessor.

For purposes of this example embodiment, control microprocessor 401 is assumed to include the following hardware functional units, shown in FIG. 9:

Central processor 901
Random access memory (RAM) 902
Non-volatile memory (NVRAM) 903
Priority interrupt dispatcher 910
High-resolution 16-bit hardware timer A 911
High-resolution 16-bit hardware timer B 912
16-bit clock comparator register A 921
16-bit clock comparator register B 922
LED control signal output port 931
Communication input/output port 932

It will be evident to one skilled in the art that different hardware configurations for control microprocessor 401 can be equally effective through straightforward changes in software implementation.

5.3 Power Control Interrupt Handler

Power control interrupt handler 822 is the interrupt-handling module that adjusts LED control MOSFET switches 711. During each housekeeping interval, each of LEDs 701 may be on for some part of the interval and off for the remainder (in the limiting cases, LED 701 may be on or off for the entire interval). Controlling the LEDs to achieve this result means that each MOSFET switch 711 must change state twice during the interval (except in the limiting cases, which can be disregarded): once in the middle of the interval, and again at the end. At the beginning of each housekeeping interval, deadlines—typically as many as there are LEDs, or more to implement randomized pulse-width modulation—are determined relative to the start of the interval, and the high-resolution timer is set up to invoke power control interrupt handler 822 at those deadlines. Each time that power control interrupt handler 822 is invoked, it updates the state of control signals 341 to reflect the required state of LEDs at the current deadline. Power control interrupt handler 822 is a very simple piece of code: it simply transfers state from an entry in a table to the appropriate control signals 341, then updates the pointer designating the current table entry.

Figure 10:
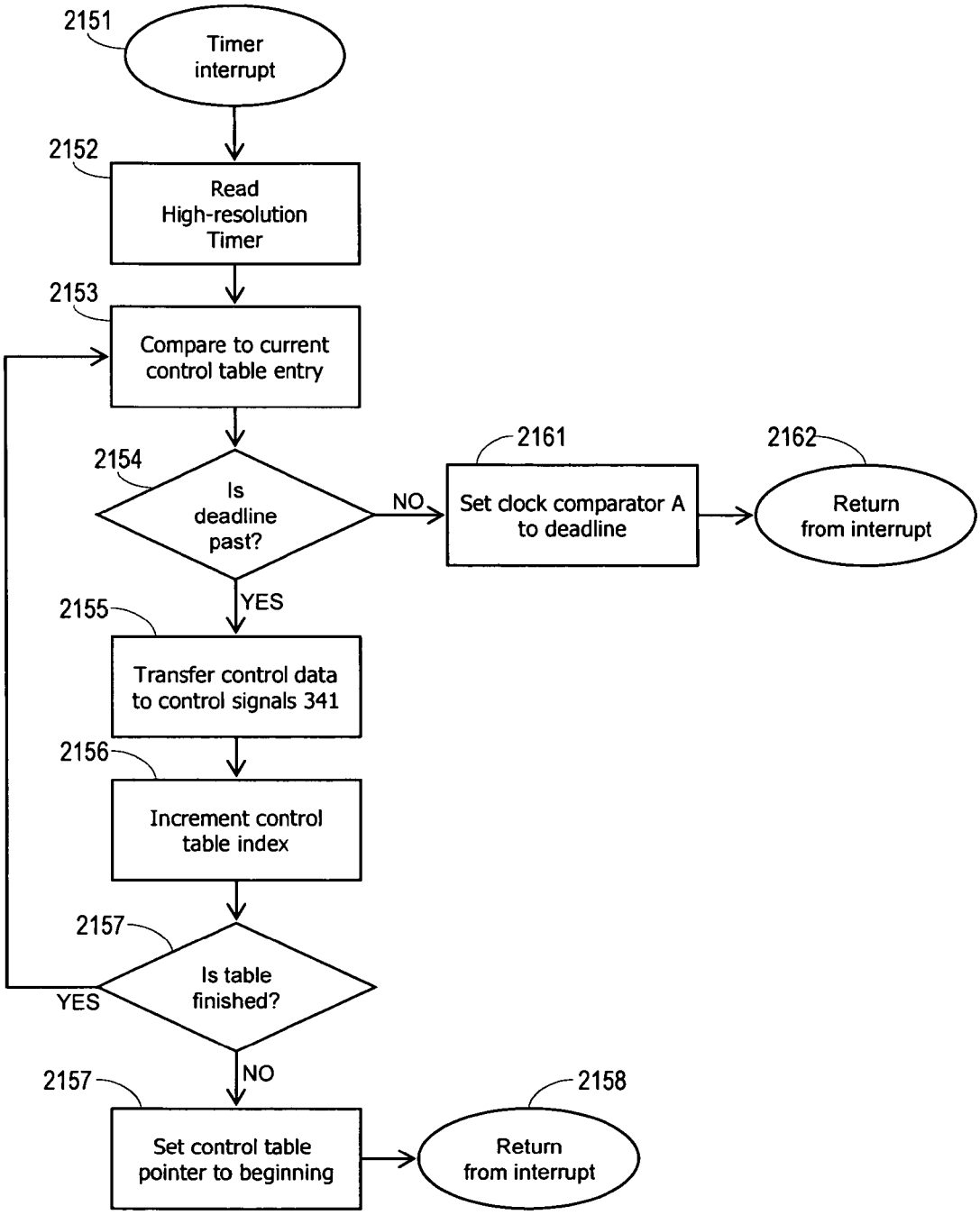
FIG. 10 shows operation of the power control interrupt handler.
Figure 11:
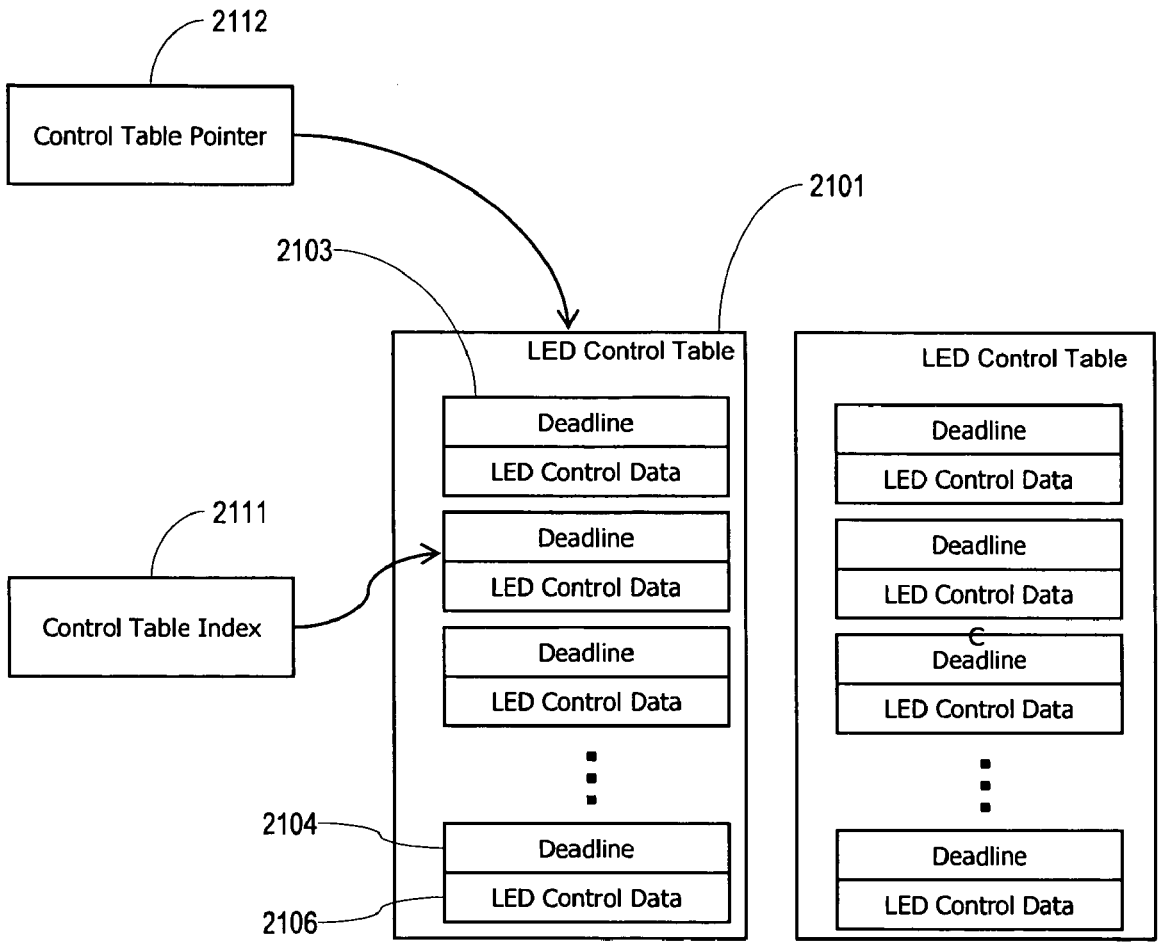
FIG. 11 shows data structures used by the power control interrupt handler.

As shown in FIG. 10, power control interrupt handler 832 is invoked by receipt of a timer interrupt (2151) from high-resolution timer A 911, It reads the high-resolution timer (2152), then obtains the value of deadline 2104 specified by the current control table entry 2103 (that is, the one designated by control table index 2111) in the current LED control table 2101, which is designated by control table pointer 2112. The deadline value is compared (2153) to the timer value. If the deadline has not passed (2154), processing is assumed to be complete. The clock comparator (which will trigger the next interrupt) is set to the deadline (2161) and the interrupt handler exits (2162). If the deadline has passed, control data 2106 is obtained from the current control table entry and transferred (2155) to LED control register port 931. Control table index 2111 is updated (2156) to designate the next control table entry. If the table has not yet been exhausted (2157), control transfers back to the initial test (2152). Otherwise, control table index 2111 is set (2157) to designate initial control table entry 2103 in control table 2101 and the interrupt handler returns (2158).

5.4 Communication Transmit Interrupt Handler

Communication transmit interrupt handler 824 operates similarly to power control interrupt handler 822, except that it uses second high-resolution hardware timer B 912 to schedule its interrupt, and it calculates timing for its interrupts directly from the data in outgoing message 2301, rather than having a distinct data structure describing deadlines such as LED control table 2101.

Communication transmit interrupt handler 824 is active only when there are outgoing messages not yet fully transmitted. At other times, second high-resolution hardware timer B 912 is disabled.

Figure 12:
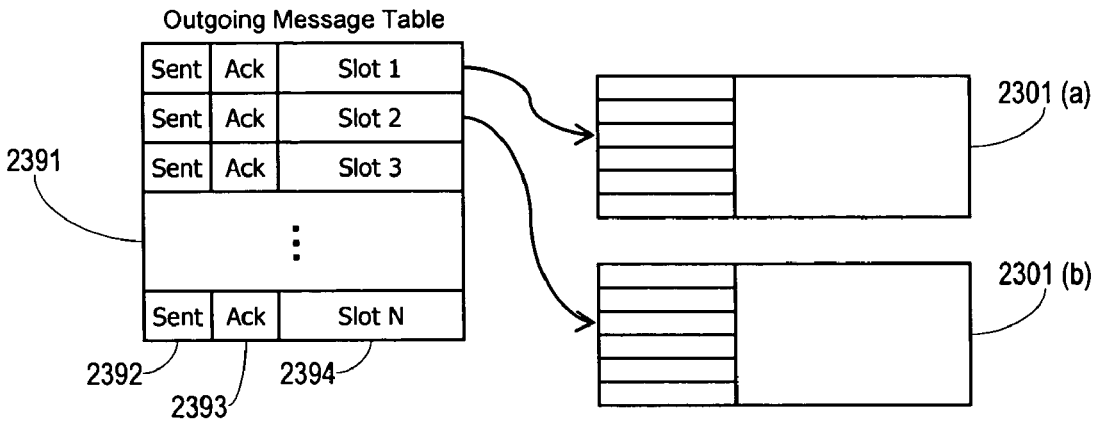
FIG. 12 shows data structures used by the communication transmit interrupt handler.
Figure 12:
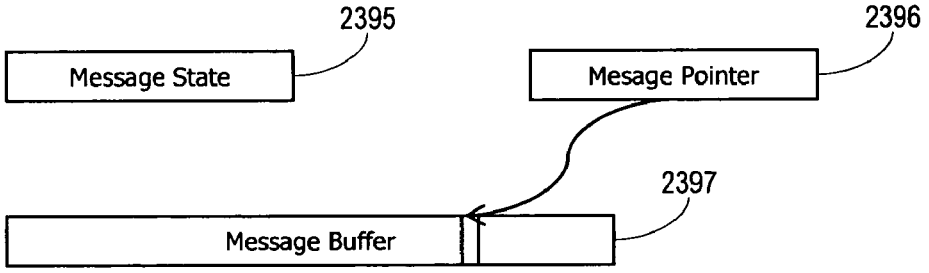

FIG. 12 shows data structures associated with communication transmit interrupt handler 824. Outgoing message table 2391 designates the messages 2301 waiting to be transmitted or acknowledged. Each message is designated (e.g., pointed to in memory) by slot pointer 2394; if a message has been transmitted, message-sent flag 2392 is set; if a message has been acknowledged, acknowledgment flag 2393 is set. For the message currently being transmitted, located in message buffer 2397 (which is simply another designation for the storage occupied by message 2301), message pointer 2396 identifies (e.g. by pointer or index) the byte in the message next to be transmitted. Message state 2395 identifies what part of transmission is happening: start-of-message pattern, end-of-message pattern, bit position within current byte (for example, in the preferred embodiment of 4-bit pulse interval modulation, bit position would indicate either the high-order or low-order four bits).

5.5 Communication Network Layer

Communication network layer 832 is responsible for reliably delivering messages, potentially to a group (multicast) address.

Figure 13:
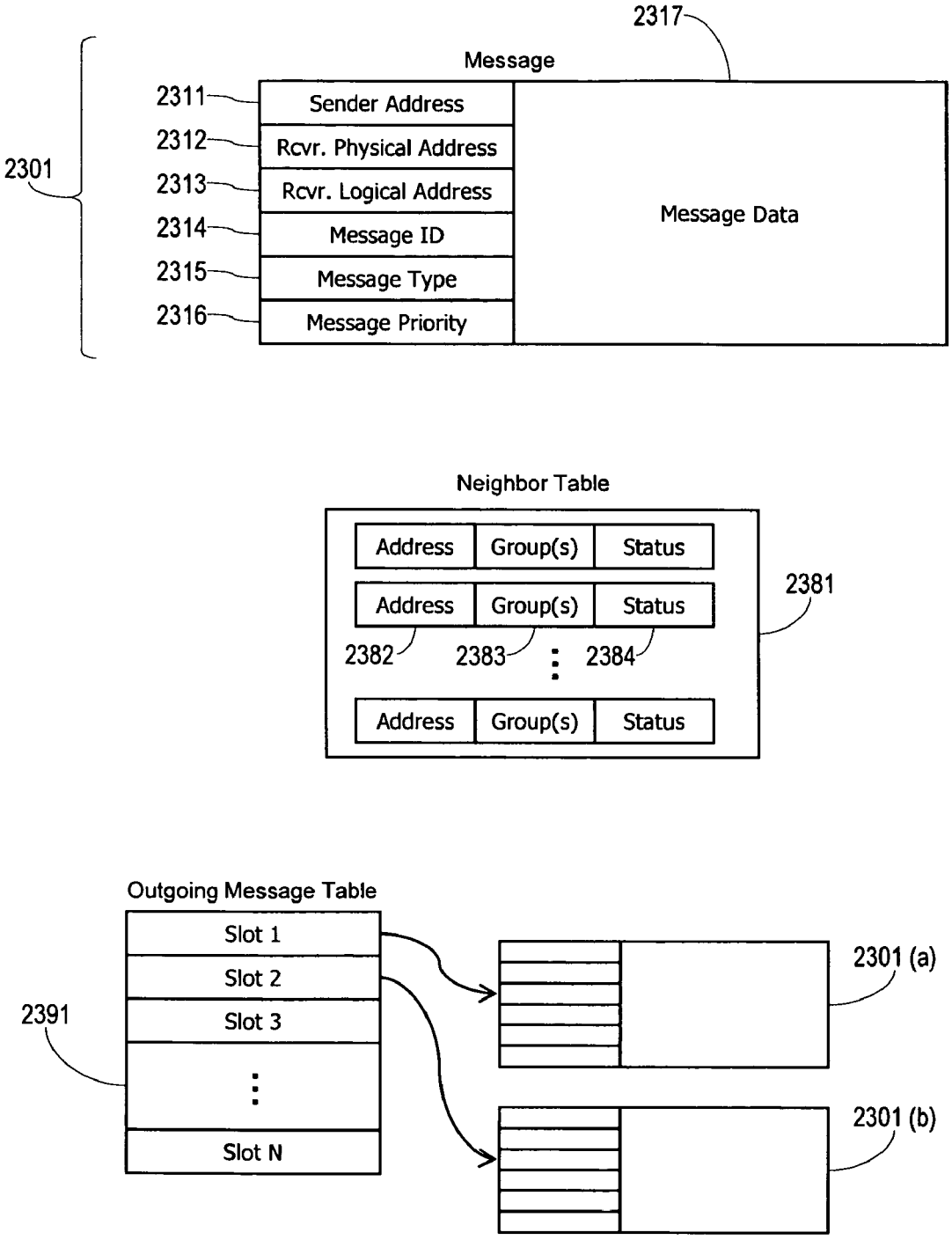
FIG. 13 shows data structures used by the communication network layer.

FIG. 13 shows the principal data structures used by communication network communication layer 832: message 2301, neighbor table 2381, outgoing message table 2391.

Message 2301 consists of sender address 2311, physical receiver address(es) 2312, logical receiver address 2313, message ID 2314, message type 2315, message priority 2316, and message data 2317.

Neighbor table 2381 has one entry for each neighboring controller 301 known to be reachable through communication interface 451. The table entries contain physical address 2382 for the neighboring controller, group list 2383 that identifies the logical groups that the neighbor belongs to, and status 2384 that records the current reachability status of the neighbor. Neighbor table 2381 is created when controller 301 joins the network, and is updated as other controllers join or leave the network and communication reachability changes, and as group membership changes.

Outgoing message table 2391 is a queue (ordered by message priority 2316 in each message 2301) of slots pointing to messages 2301 that are waiting to be delivered by communication message layer 831 using the services of communication transmit interrupt handler 824.

Figure 14:
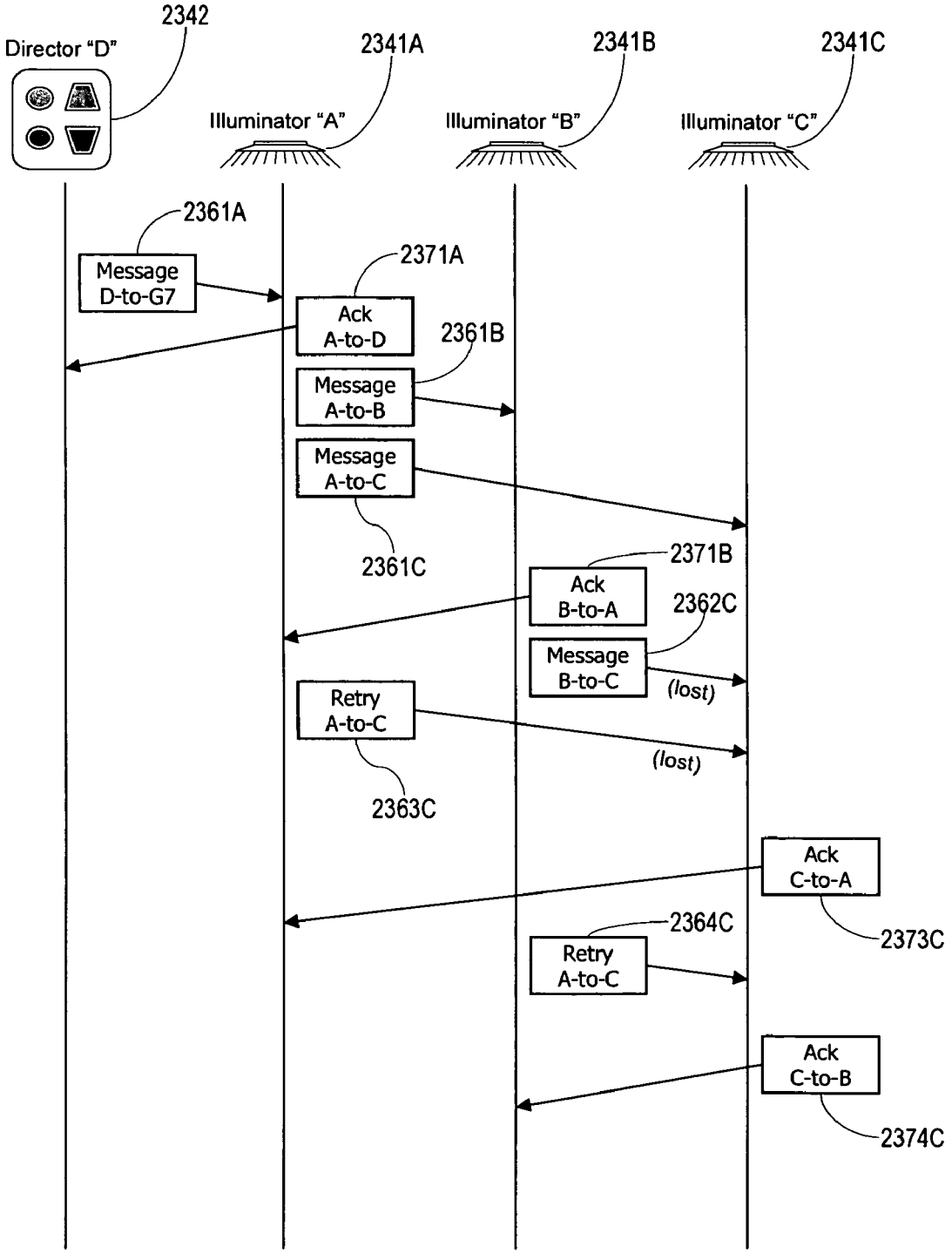
FIG. 14 shows a simple group broadcast operation.

FIG. 14 shows a simple example of message delivery and forwarding to a group of controllers. This function is a core function for network communication layer 832, since it underlies all the distributed processing behaviors described above.

Message 2361A (sent by director 2342) is received by first illuminator 2341A. Message 2361A has a physical receiver address 2312 of "any", and a logical receiver address of "Group-7".

Illuminator 2341A consults outgoing message table 2391 to see if message 2361A has been processed already (i.e., if its message ID 2314 is present in table 2391). If so, it ignores message 2361A. This situation can occur, for example, if message 2361A has been forwarded through several other illuminators before finally returning to illuminator 2341A.

Since message 2361A has a non-null sender address 2311, illuminator 2341A sends acknowledgment 2371A to director 2342.

Illuminator 2341A consults neighbor table 2381 to determine whether any of its neighboring illuminators belong to the addressed group ("Group-7"). For each neighbor belonging to the group, illuminator 2341A creates a copy of message 2361A, identical to the one it received except for sender address 2311 (which is set to "Illuminator A") and physical receiver address 2312 (which is set to the address of the identified illuminator) and records it in outgoing message table 2391. In this example, illuminators 2341B and 2341C are the two that belong to "Group-7" and will be addressed by messages 2361B and 2361C.

Communication message layer 831 in illuminator 2341A processes the queued messages 2361B and 2361C and sends them.

Also, if illuminator 2341A belongs to "Group-7", communication network layer 832 routes message 2361A to appropriate behavior modules 801 for processing.

In this example, illuminator 2341B receives message 2361B. It recognizes it as being addressed to it and processes the message in the same manner as illuminator 2341A. Because the message came from illuminator 2341A, illuminator 2341B does not send a copy back, but it does send a copy 2362C to illuminator 2341C, and a acknowledgment 2372A back to illuminator 2341A In this example, illuminator 2341C does not successfully receive either message 2361C or message 2362C (perhaps because they were transmitted simultaneously, causing a collision that damages both messages). Both illuminator 2341A and illuminator 2341B are waiting for acknowledgment messages; when those acknowledgments do not arrive, each waits a pseudo-random length of time (to avoid collisions) and sends retry messages 2363C and 2364C.

Illuminator 2341C successfully receives message 2363C, processes it as described above, and sends acknowledgment 2373C back to illuminator 2341A.

Illuminator 2341C also successfully receives message 2364C, but recognizes it as a duplicate because message ID 2314 has already been recorded in its outgoing message table 2381. Illuminator 2341C also sends acknowledgment 2374C back to illuminator 2341B, preventing redundant message traffic.

5.6 Distributed Occupancy Sensing

Controller 301 can run an instance of behavior module 801 implementing distributed occupancy sensing as described above in section 3.6, Occupancy Response.

Sensors used for occupancy detection typically are inherently noisy; that is, they may generate electrical signals even when no actual occupancy event has taken place. The software implementing occupancy response can employ signal processing algorithms to eliminate the effects of such noise and calculate an average value of occupancy indication that can be compared against thresholds to trigger behavior. Thresholds can be pre-determined, adjusted explicitly by a system user, and/or adjusted automatically in response to detected behavior.

Figure 15:
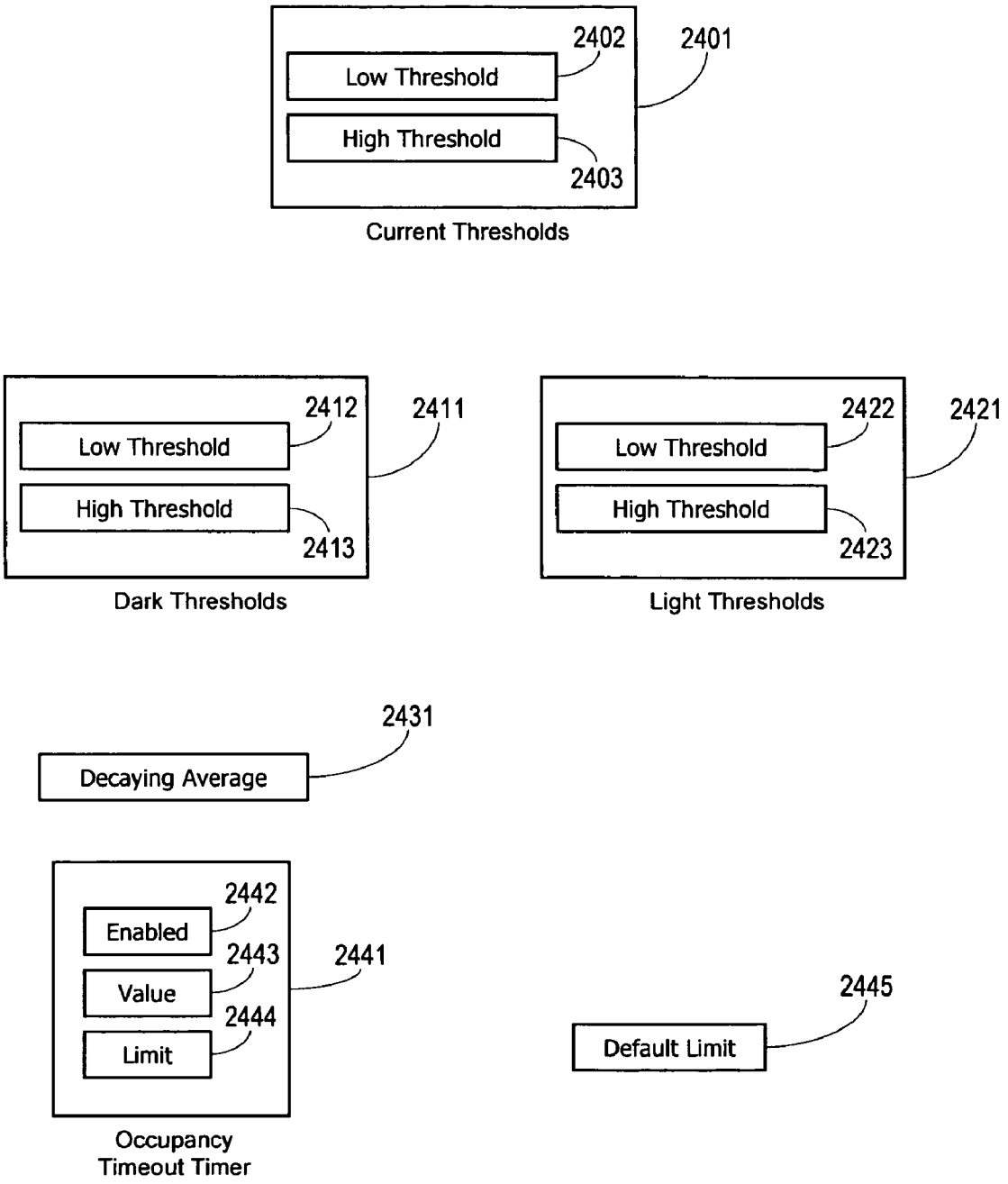
FIG. 15 shows data structures used for single-unit occupancy sensing
Figure 16:
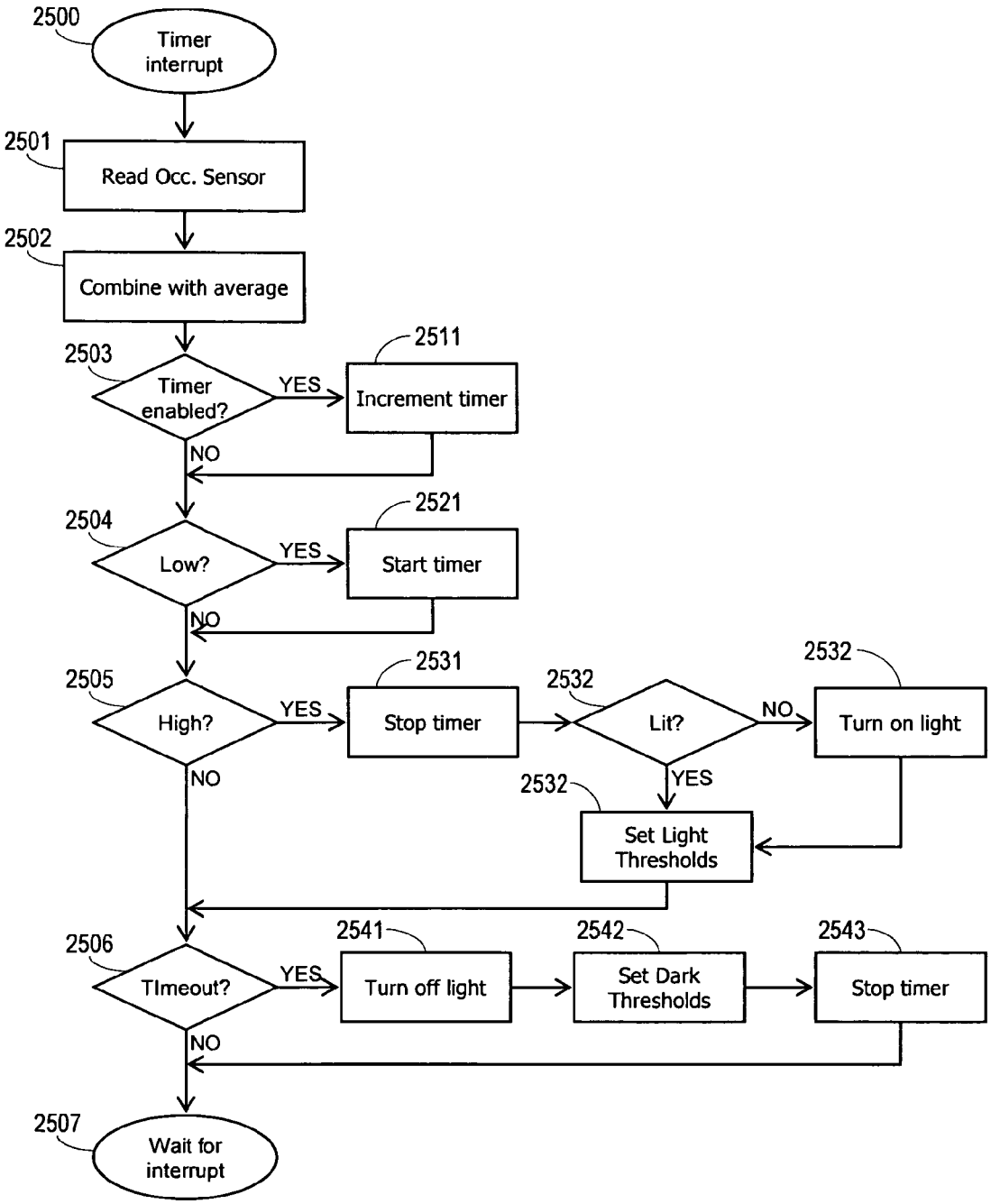
FIG. 16 shows operation of single-unit occupancy sensing

FIG. 16 illustrates how a single illuminator could implement occupancy response behavior; FIG. 15 shows the data elements used by the process shown in FIG. 16. Current thresholds 2401 consists of current low threshold 2402 and current high threshold 2403, and is a dynamic data structure that governs the behavior of the illuminator 111 while it is operating. Dark thresholds 2411 consists of static default values that are transferred into current thresholds 2401 when illuminator 111 enters an active unlit condition (e.g., when occupancy sensing determines that there are no occupants). Similarly, light thresholds 2421 consists of static default values that are transferred into current thresholds 2401 when illuminator 111 enters an active lit condition (e.g., when occupancy sensing determine that occupants are present, or when explicitly commanded to be on). Decaying average 2431 represents the average output level from an occupancy sensor over a recent time interval. Occupancy timeout timer 2441 consists of timer value 2443, timer limit 2444, and timer enabled flag 2441. When the timer is enabled, its value is incremented at every sampling interval. Typically, light thresholds 2421, dark thresholds 2411, and default timeout limit 2445 would be contained in external parameter block 802 associated with behavior module 801 implementing the occupancy detection behavior. Each threshold has two values, between which no state changes. Two values provide a degree of hysteresis in operation; they could be combined to a single threshold.

As shown in FIG. 16, occupancy response algorithms implemented by behavior module 801 would typically run a loop. Each iteration begins with a timer interrupt (2500) that typically is generated by housekeeping interrupt handler 821. The software obtains the current value of the occupancy sensor (2501) and combines it with decaying average value 2431 to obtain a new value for the average (2502).

If occupancy timer enabled flag 2442 is set (2503), occupancy timer value 2443 is increased by one (2511).

Decaying average value 2431 is compared with current low threshold 2402 (2504); if decaying average value 2431 is lower than the threshold, occupancy timeout timer 2441 is cleared and started (2521) by setting occupancy timer value 2443 to zero and setting occupancy timer enabled flag 2442.

Decaying average value 2431 is compared with current high threshold 2403 (2505); if decaying average value 2431 is higher than the threshold, occupancy timeout timer 2441 is stopped (2531) by clearing occupancy timer enabled flag 2442. If illuminator 111 is currently off (2532), it is turned on (2533). Current thresholds 2401 are set to the values of light thresholds 2421 (2534).

If occupancy timer value 2443 exceeds occupancy timer limit 2444 (2506), illuminator 111 is turned off (2541), current thresholds 2401 are set to the values of dark thresholds 2411 (2542), and occupancy timer 2441 is disabled (2543).

Once the processing loop is completed, the software waits for another timer interrupt (2507).

The occupancy response for a single illuminator shown in FIG. 16 can act as a basis for distributed occupancy sensing. For example, whenever step 2533 are executed, to turn the light on, first illuminator 111 can broadcast that decision to second illuminators 111, by sending a message, instructing them to take the same action, so that a single illuminator detecting motion can cause an entire room to be illuminated, or to stay illuminated.

As another example, rather than executing step 2541 immediately to turn off a light, first illuminator 111 can broadcast a message indicating that it intends to turn off the light, and remember the fact that the light is ready to turned off without actually turning off the light. If any other illuminator has not yet reached the same state (i.e., is still illuminated and is waiting for its own occupancy timer 2441 to expire), it responds with a message to first illuminator 111, to indicate that its light should stay on. If first illuminator 111 receives no such messages within an appropriate interval, it turns off its light and broadcasts a message to other illuminators directing them to turn off as well.

If illuminator 111 turns off the light (step 2541) and then promptly detects occupancy (step 2505), this situation indicates that the room was occupied, that the occupants reacted to the light being turned off, and therefore that current threshold values 2401 were insufficiently sensitive. When illuminator 111 recognizes such a situation, threshold values can be adjusted to make the situation less likely to occur in the future.

Current threshold values 2401 and occupancy timeout limit 2444 can be adjusted in response to messages from other illuminators that indicate their history of occupancy sensor values.

Illuminator 111 can gradually adjust the brightness level up or down as part of steps 2532 and 2541, rather than turning the light on and off suddenly.

Illuminator 111 can blink the light or otherwise make a visible or audible signal for occupants when a timeout is initially detected (2506) and allow the timer to run to another limit before turning off the light. Such an indication can allow the occupant to respond while the light is still illuminated, so that room illumination is not disrupted.

While this invention has been particularly shown and described with references to example embodiments thereof, it will be understood by those skilled in the art that various changes in form and details may be made therein without departing from the scope of the invention encompassed by the appended claims.

What is claimed is:

[1. A lighting system comprising a plurality of illuminators displaced relative to each other, each of plural illuminators comprising:

a light source;

a sensor;

a communications interface communicating with other illuminators in a network;

a processor responsive to the sensor, the processor controlling the illuminator; the processors of plural illuminators configured to make illumination decisions through distributed processing across the network based on information exchange among the illuminators through the communication interfaces; and a plurality of radio-frequency gateways that allow isolated portions of the system to communicate with each other.]

[2. The system of claim 1, wherein the gateways are integrated into plural illuminators.]

[3. A lighting system comprising a plurality of illuminators displaced relative to each other, each of plural illuminators comprising:

a light source;

a sensor;

a communications interface communicating with other illuminators in a network; and a processor responsive to the sensor, the processor controlling the illuminator; the processors of plural illuminators configured to make illumination decisions through distributed processing across the network based on information exchange among the illuminators through the communication interfaces, wherein the processors forming the distributed network make lighting decisions according to a polling algorithm.]

[4. The system of claim 3, wherein the polling algorithm weights stimuli sensed across the distributed network.]

[5. A method for providing illumination comprising:

at each of plural illuminators, emitting light from an illuminator, sensing stimuli with a sensor, and communicating with other illuminators through a communications interface;

processing responses to the sensed stimuli across a distributed network of the plural illuminators to make illumination decisions; and using radio-frequency gateways that allow isolated portions of the distributed network to communicate with each other.]

[6. The method of claim 5, wherein the gateways are integrated into plural illuminators.]

[7. A method for providing illumination comprising:

at each of plural illuminators, emitting light from an illuminator, sensing stimuli with a sensor, and communicating with other illuminators through a communications interface; and processing responses to the sensed stimuli across a distributed network of the plural illuminators to make illumination decisions, wherein the processing across the distributed network makes lighting decisions according to a polling algorithm.]

[8. The method of claim 7, wherein the polling algorithm weights the stimuli sensed across the distributed network.]

[9. A method for providing illumination comprising:

at each of plural illuminators, emitting light from an illuminator, sensing stimuli with a sensor, and communicating with other illuminators through a communications interface; and processing responses to the sensed stimuli across a distributed network of the plural illuminators to make illumination decisions, wherein the processing comprises using a clock to control the timing of lighting decisions across the network.]

[10. A method for providing illumination comprising:

at each of plural illuminators, emitting light from an illuminator, sensing stimuli with a sensor, and communicating with other illuminators through a communications interface; and processing responses to the sensed stimuli across a distributed network of the plural illuminators to make illumination decisions, wherein the processing comprises responding to instructions for reduced emission at an illuminator by controlling emissions by neighboring illuminators to produce patterns of illumination.]

[11. A method for providing illumination comprising:

at each of plural illuminators, emitting light from an illuminator, sensing stimuli with a sensor, and communicating with other illuminators through a communications interface; and processing responses to the sensed stimuli across a distributed network of the plural illuminators to make illumination decisions, wherein the processing comprises learning reactions to stimuli according to a training set.]

*12. An illuminator that acts as a node in a distributed mesh network comprising:*

*an LED light source;*

*a wireless communication interface; and*

*control circuitry associated with the wireless communication interface and adapted to:*

*receive a message addressed to a logical group of illuminators;*

*determine if one or more neighboring illuminators belongs to the logical group of illuminators;*

*forward the message to each of the one or more neighboring illuminators belonging to the logical group of illuminators; and*

*control light emitted by the LED light source, wherein the illuminator is a mesh network node.*

*13. The illuminator of claim 12 wherein:*

*the message includes a control request; and*

*the control circuitry is further adapted to determine if the illuminator belongs to the logical group of illuminators, and if the illuminator does belong to the logical group of illuminators, control the light emitted by the LED light source based on the control request such that all illuminators in the logical group of illuminators respond to the control request as an associated group.*

*14. The illuminator of claim 12 wherein the control circuitry is further adapted to send a control request via the wireless communication interface to at least one of the one or more neighboring illuminators.*

*15. The illuminator of claim 12 wherein the control circuitry is further adapted to:*

*receive a first control request via the wireless communication interface from a first one of the one or more neighboring illuminators and control the light emitted by the LED light source based on the first control request; and*

*generate and send a second control request via the wireless communication interface to the first one of the one or more neighboring illuminators.*

*16. An illuminator comprising:*

*an LED light source having at least one LED;*

*a wireless communication interface;*

*processing circuitry; and*

*a memory coupled to the processing circuitry, the memory storing instructions, which, when executed by the processing circuitry cause the illuminator to:*

*assign a new identifier to the illuminator based on interaction with one or more other illuminators via the wireless communication interface such that the illuminator and the one or more other illuminators are each assigned different identifiers automatically without manual intervention; and*

*control light emitted by the LED light source.*

*17. The illuminator of claim 16 wherein the memory stores further instructions, which, when executed by the processing circuitry cause the illuminator to provide the new identifier to a director via the wireless communication interface.*

*18. The illuminator of claim 16 wherein the memory stores further instructions, which, when executed by the processing circuitry cause the illuminator to update the new identifier.*

*19. The illuminator of claim 16 wherein the memory stores further instructions, which, when executed by the processing circuitry cause the illuminator to automatically initiate interaction with the one or more other illuminators via the wireless communication interface to assign the new identifier to the illuminator in response to installation of the illuminator.*

*20. The illuminator of claim 16 wherein the illuminator is a mesh network node in a lighting network and the memory stores further instructions, which, when executed by the processing circuitry cause the illuminator to receive a message from at least one illuminator and send the message to at least one other illuminator.*

*21. The illuminator of claim 20 wherein the memory stores further instructions, which, when executed by the processing circuitry cause the illuminator to receive a control request via the wireless communication interface from the at least one illuminator and control the light emitted by the LED light source based on the control request.*

*22. The illuminator of claim 20 wherein the memory stores further instructions, which, when executed by the processing circuitry cause the illuminator to send a control request via the wireless communication interface to the at least one illuminator.*

* * * * *